US011698605B2

(12) United States Patent
Fattal

(10) Patent No.: US 11,698,605 B2
(45) Date of Patent: Jul. 11, 2023

(54) HOLOGRAPHIC REALITY SYSTEM, MULTIVIEW DISPLAY, AND METHOD

(71) Applicant: LEIA INC., Menlo Park, CA (US)

(72) Inventor: David A. Fattal, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 4 days.

(21) Appl. No.: 17/200,681

(22) Filed: Mar. 12, 2021

(65) Prior Publication Data

US 2021/0200150 A1    Jul. 1, 2021

Related U.S. Application Data

(63) Continuation of application No. PCT/US2018/053816, filed on Oct. 1, 2018.

(51) Int. Cl.
*G03H 1/00* (2006.01)
*G06F 3/01* (2006.01)
(Continued)

(52) U.S. Cl.
CPC ........... *G03H 1/0005* (2013.01); *G06F 3/016* (2013.01); *G06F 3/017* (2013.01);
(Continued)

(58) Field of Classification Search
CPC ...... G06F 3/016; G06F 3/017; G06F 3/04812; G03H 1/0005; G03H 2001/0061; G03H 2226/05
See application file for complete search history.

(56) References Cited

U.S. PATENT DOCUMENTS 6,191,796 B1    2/2001    Tarr
6,313,866 B1    11/2001    Akamatsu et al.
(Continued)

FOREIGN PATENT DOCUMENTS

CN    107221223 A    9/2017
EP    2518590 A1    10/2012
(Continued)

OTHER PUBLICATIONS

International Search Report and Written Opinion (ISRWO) by International Searching Authority (ISA) Korean Intellectual Property Office (KIPO) dated Jun. 28, 2019 (12 pages) for foreign counterpart PCT Application No. PCT/US2018/053816.
(Continued)

*Primary Examiner* — Tadesse Hailu
(74) *Attorney, Agent, or Firm* — J. Michael Johnson

(57) ABSTRACT

A holographic reality system and multiview display monitor a user position and provide virtual haptic feedback to the user. The holographic reality system includes a multiview display configured to display a multiview image, a position sensor configured to monitor the user position, and a virtual haptic feedback unit configured to provide the virtual haptic feedback. An extent of the virtual haptic feedback corresponds to an extent of a virtual control within the multiview image. The holographic reality multiview display includes an array of multiview pixels configured to provide different views of the multiview image by modulating directional light beams having directions corresponding to the different views and an array of multibeam elements configured to provide the directional light beams to corresponding multiview pixels.

16 Claims, 9 Drawing Sheets

(51) Int. Cl.
    *G06F 3/0481*     (2022.01)
    *G06F 3/04812*     (2022.01)

(52) U.S. Cl.
    CPC . *G06F 3/04812* (2013.01); *G03H 2001/0061* (2013.01); *G03H 2226/05* (2013.01)

(56) References Cited

U.S. PATENT DOCUMENTS

| | | | | |
|---|---|---|---|---|
| 7,834,850 | B2* | 11/2010 | Boillot | G06F 3/016 |
| | | | | 345/158 |
| 9,128,226 | B2 | 9/2015 | Fattal et al. | |
| 9,201,270 | B2 | 12/2015 | Fattal et al. | |
| 9,298,168 | B2 | 3/2016 | Taff et al. | |
| 9,389,415 | B2 | 7/2016 | Fattal et al. | |
| 9,459,461 | B2 | 10/2016 | Santori et al. | |
| 9,557,466 | B2 | 1/2017 | Fattal | |
| 9,785,119 | B2 | 10/2017 | Taff et al. | |
| 10,216,145 | B2* | 2/2019 | Kline | G06F 3/017 |
| 10,345,505 | B2 | 7/2019 | Fattal | |
| 10,551,546 | B2 | 2/2020 | Fattal | |
| 10,649,128 | B2 | 5/2020 | Fattal et al. | |
| 10,728,533 | B2 | 7/2020 | Fattal | |
| 10,798,371 | B2 | 10/2020 | Fattal | |
| 10,821,831 | B2 | 11/2020 | Tumler et al. | |
| 10,830,939 | B2 | 11/2020 | Fattal et al. | |
| 10,838,134 | B2 | 11/2020 | Fattal et al. | |
| 10,884,175 | B2 | 1/2021 | Fattal | |
| 10,928,677 | B2 | 2/2021 | Aieta et al. | |
| 10,996,814 | B2 | 5/2021 | Gelman et al. | |
| 11,048,329 | B1* | 6/2021 | Lee | G06F 3/011 |
| 11,347,354 | B1* | 5/2022 | Clements | G02B 30/56 |
| 2005/0002074 | A1 | 1/2005 | McPheters et al. | |
| 2006/0279567 | A1* | 12/2006 | Schwerdtner | H04N 13/32 |
| | | | | 345/419 |
| 2011/0157667 | A1* | 6/2011 | Lacoste | G03H 1/0808 |
| | | | | 359/9 |
| 2012/0194477 | A1* | 8/2012 | Krah | G06F 3/04166 |
| | | | | 345/175 |
| 2013/0169518 | A1 | 7/2013 | Wu et al. | |
| 2014/0176432 | A1 | 6/2014 | Park et al. | |
| 2014/0282008 | A1* | 9/2014 | Verard | G03H 1/0005 |
| | | | | 715/728 |
| 2014/0306891 | A1 | 10/2014 | Latta et al. | |
| 2015/0121287 | A1* | 4/2015 | Fermon | G06F 3/0304 |
| | | | | 715/773 |
| 2016/0219268 | A1* | 7/2016 | Ström | H04N 13/398 |
| 2017/0068213 | A1* | 3/2017 | Rhee | G03H 1/2294 |
| 2017/0082273 | A1 | 3/2017 | Cotte | |
| 2017/0085867 | A1* | 3/2017 | Baran | H04N 13/122 |
| 2017/0235372 | A1* | 8/2017 | Song | G03H 1/024 |
| | | | | 345/158 |
| 2017/0309049 | A1* | 10/2017 | Law | G06T 15/205 |
| 2017/0363794 | A1 | 12/2017 | Wan et al. | |
| 2018/0011237 | A1 | 1/2018 | Fattal | |
| 2018/0210551 | A1 | 7/2018 | Kitagawa | |
| 2018/0246330 | A1 | 8/2018 | Fattal | |
| 2018/0348705 | A1* | 12/2018 | Rakshit | G02B 26/004 |
| 2019/0011621 | A1* | 1/2019 | Karafin | G02B 6/29325 |
| 2019/0091565 | A1* | 3/2019 | Nelson | G07F 17/3216 |
| 2019/0147665 | A1* | 5/2019 | Banavara | G06V 20/20 |
| | | | | 345/419 |
| 2020/0368616 | A1* | 11/2020 | Delamont | A63F 13/213 |
| 2020/0371378 | A1* | 11/2020 | Makinen | G02B 30/50 |
| 2020/0380762 | A1* | 12/2020 | Karafin | G06T 17/20 |
| 2021/0223568 | A1* | 7/2021 | Makinen | H04N 13/31 |

FOREIGN PATENT DOCUMENTS

| | | |
|---|---|---|
| JP | 2017162195 A | 9/2017 |
| WO | 2012038856 A1 | 3/2012 |
| WO | 2017132579 A1 | 8/2017 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

* cited by examiner

HOLOGRAPHIC REALITY SYSTEM, MULTIVIEW DISPLAY, AND METHOD

CROSS-REFERENCE TO RELATED APPLICATIONS

This application is a continuation application of and claims the benefit of priority to prior International Patent Application No. PCT/US2018/053816, filed Oct. 1, 2018, the entirety of which is incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide a system and a display configure to create holographic reality for a user. In particular, a holographic reality system may include a multiview display that is configured to display a multiview image comprising multiview or three-dimensional (3D) content. Moreover, the holographic reality system may include a position sensor (such as a capacitive sensor, two or more image sensors, or a time-of-flight sensor) configured to monitor a position a hand of a user without contact between the user and the multiview display or the position sensor. Further, the holographic reality system may include a feedback unit configured to provide, based at least in part on the monitored position, virtual haptic feedback to the user without contact between the user and the holographic reality system. For example, the position sensor unit may detect a gesture corresponding to a command and the virtual haptic feedback unit may provide information about activation of a virtual control in a multiview image in response to the monitored hand position. Additionally, the holographic reality system may be configured to modify multiview content of the multiview image based at least in part on the monitored position.

Herein a 'two-dimensional display' or '2D display' is defined as a display configured to provide a view of an image that is substantially the same regardless of a direction from which the image is viewed (i.e., within a predefined viewing angle or range of the 2D display). A liquid crystal display (LCD) found in may smart phones and computer monitors are examples of 2D displays. In contrast herein, a 'multiview display' is defined as an electronic display or display system configured to provide different views of a multiview image in or from different view directions. In particular, the different views may represent different perspective views of a scene or object of the multiview image. In some instances, a multiview display may also be referred to as a three-dimensional (3D) display, e.g., when simultaneously viewing two different views of the multiview image provides a perception of viewing a three dimensional image.

Figure 1A:
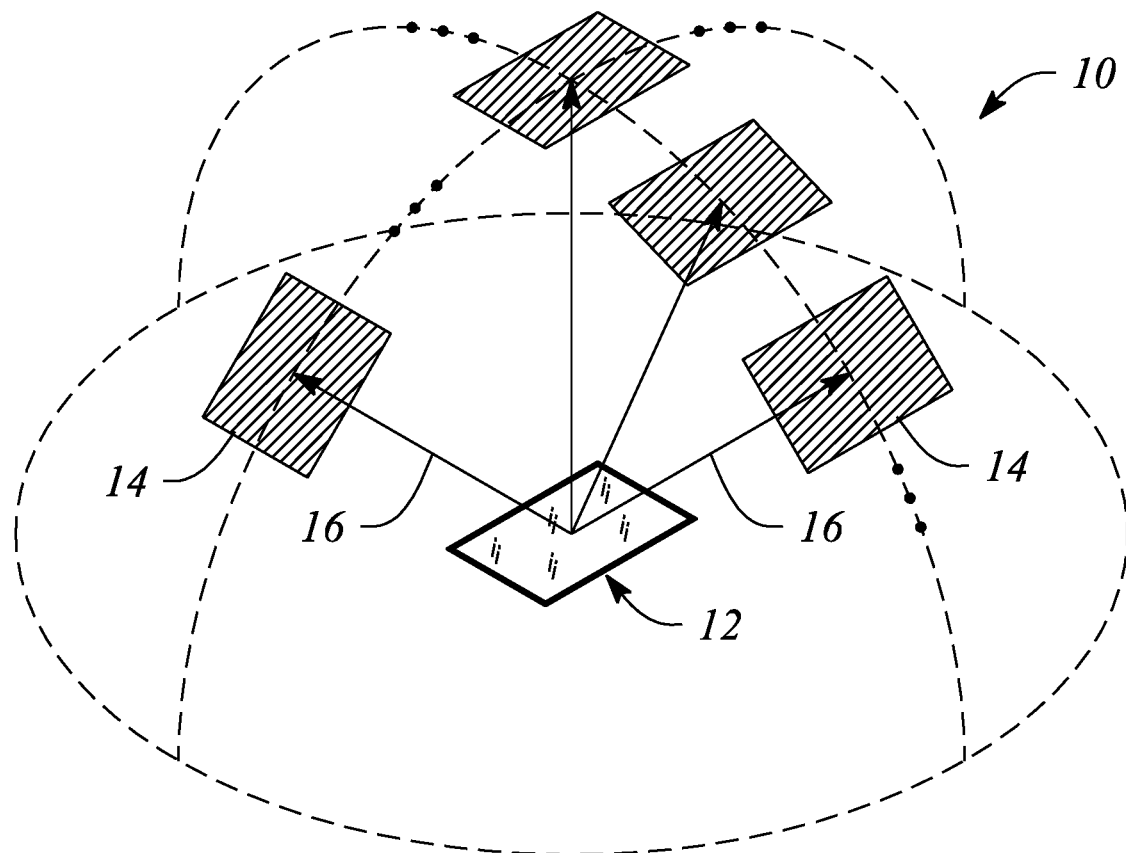
FIG. 1A illustrates a perspective view of a multiview display in an example, according to an embodiment consistent with the principles described herein.

FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

Figure 1B:
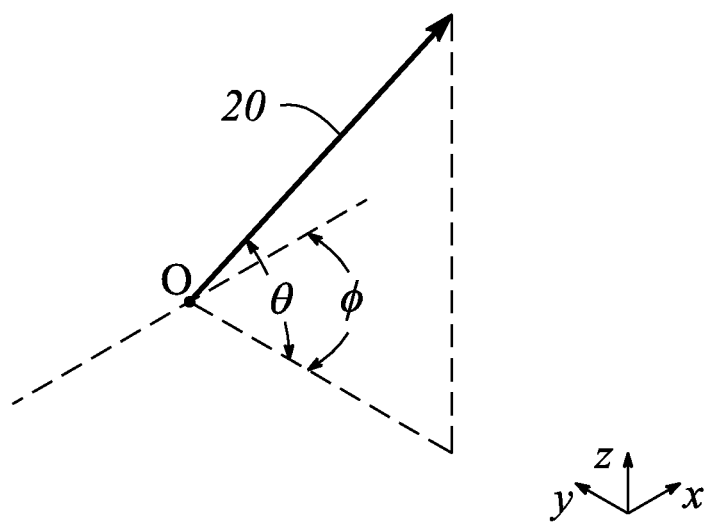
FIG. 1B illustrates a graphical representation of angular components of a light beam having a particular principal angular direction corresponding to a view direction of a multiview display in an example, according to an embodiment consistent with the principles described herein.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\theta$ is an angle in a horizontal plane (e.g., parallel to the multiview display screen plane). FIG. 1B illustrates a graphical representation of the angular components $\{\theta, \phi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set or group of sub-pixels (such as light valves) representing 'view' pixels in each view of a plurality of different views of a multiview display. In particular, a multiview pixel may have an individual sub-pixel corresponding to or representing a view pixel in each of the different views of the multiview image. Moreover, the sub-pixels of the multiview pixel are so-called 'directional pixels' in that each of the sub-pixels is associated with a predetermined view direction of a corresponding one of the different views, by definition herein. Further, according to various examples and embodiments, the different view pixels represented by the sub-pixels of a multiview pixel may have equivalent or at least substantially similar locations or coordinates in each of the different views. For example, a first multiview pixel may have individual sub-pixels corresponding to view pixels located at $\{x_1, y_1\}$ in each of the different views of a multiview image, while a second multiview pixel may have individual sub-pixels corresponding to view pixels located at $\{x_2, y_2\}$ in each of the different views, and so on.

In some embodiments, a number of sub-pixels in a multiview pixel may be equal to a number of different views of the multiview display. For example, the multiview pixel may provide sixty-four (64) sub-pixels in associated with a multiview display having 64 different views. In another example, the multiview display may provide an eight by four array of views (i.e., 32 views) and the multiview pixel may include thirty-two 32 sub-pixels (i.e., one for each view). Additionally, each different sub-pixel may have an associated direction (e.g., light beam principal angular direction) that corresponds to a different one of the view directions corresponding to the 64 different views, for example. Further, according to some embodiments, a number of multiview pixels of the multiview display may be substantially equal to a number of 'view' pixels (i.e., pixels that make up a selected view) in the multiview display views. For example, if a view includes six hundred forty by four hundred eighty view pixels (i.e., a 640×480 view resolution), the multiview display may have three hundred seven thousand two hundred (307,200) multiview pixels. In another example, when the views include one hundred by one hundred pixels, the multiview display may include a total of ten thousand (i.e., 100×100=10,000) multiview pixels.

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the plate light guide to guide light.

Herein, a 'diffraction grating' is broadly defined as a plurality of features (i.e., diffractive features) arranged to provide diffraction of light incident on the diffraction grating. In some examples, the plurality of features may be arranged in a periodic manner or a quasi-periodic manner. In other examples, the diffraction grating may be a mixed-period diffraction grating that includes a plurality of diffraction gratings, each diffraction grating of the plurality having a different periodic arrangement of features. Further, the diffraction grating may include a plurality of features (e.g., a plurality of grooves or ridges in a material surface) arranged in a one-dimensional (1D) array. Alternatively, the diffraction grating may comprise a two-dimensional (2D) array of features or an array of features that are defined in two dimensions. The diffraction grating may be a 2D array of bumps on or holes in a material surface, for example. In some examples, the diffraction grating may be substantially periodic in a first direction or dimension and substantially aperiodic (e.g., constant, random, etc.) in another direction across or along the diffraction grating.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a diffractive multibeam element, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n\sin\theta_i - \frac{m\lambda}{d}\right) \qquad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer (i.e., m=±1, ±2, . . . ). A diffraction angle $\theta_m$ of a light beam produced by the diffraction grating may be given by equation (1). First-order diffraction or more specifically a first-order diffraction angle $\theta_m$ is provided when the diffraction order m is equal to one (i.e., m=1).

Figure 2:
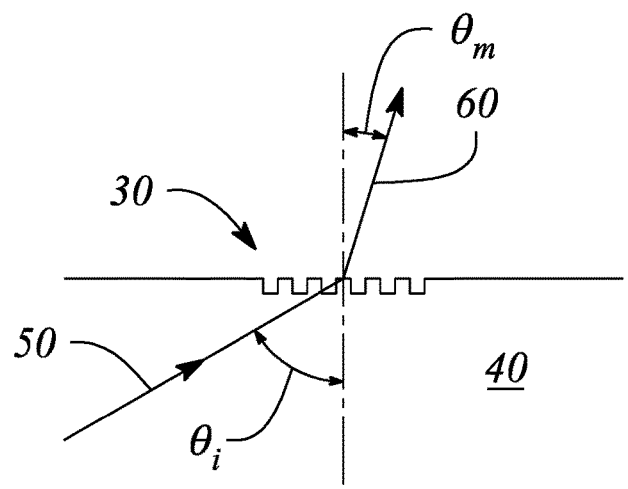
FIG. 2 illustrates a cross sectional view of a diffraction grating in an example, according to an embodiment consistent with the principles described herein.

FIG. 2 illustrates a cross sectional view of a diffraction grating 30 in an example, according to an embodiment consistent with the principles described herein. For example, the diffraction grating 30 may be located on a surface of a light guide 40. In addition, FIG. 2 illustrates a light beam 50 incident on the diffraction grating 30 at an incident angle $\theta_i$. The incident light beam 50 is a guided light beam within the light guide 40. Also illustrated in FIG. 2 is a directional light beam 60 diffractively produced and coupled or scattered by the diffraction grating 30 out of the light guide 40 as a result of diffraction of the incident light beam 50. The directional light beam 50 has a diffraction angle $\theta_m$ (or 'principal angular direction' herein) as given by equation (1). The directional light beam 60 may correspond to a diffraction order 'm' of the diffraction grating 30, for example.

Further, the diffractive features may be curved and may also have a predetermined orientation (e.g., a slant or a rotation) relative to a propagation direction of light, according to some embodiments. One or both of the curve of the diffractive features and the orientation of the diffractive features may be configured to control a direction of light scattered out by the diffraction grating, for example. For example, a principal angular direction of the directional light may be a function of an angle of the diffractive feature at a point at which the light is incident on the diffraction grating relative to a propagation direction of the incident light.

By definition herein, a 'multibeam element' is a structure or element of a backlight or a display that produces light that includes a plurality of light beams. A 'diffractive' multibeam element is a multibeam element that produces the plurality of light beams by or using diffractive coupling, by definition. In particular, in some embodiments, the diffractive multibeam element may be optically coupled to a light guide of a backlight to provide the plurality of light beams by diffractively coupling out a portion of light guided in the light guide. Further, by definition herein, a diffractive multibeam element comprises a plurality of diffraction gratings within a boundary or extent of the multibeam element. The light beams of the plurality of light beams (or 'light beam plurality') produced by a multibeam element have different principal angular directions from one another, by definition herein. In particular, by definition, a light beam of the light beam plurality has a predetermined principal angular direction that is different from another light beam of the light beam plurality. According to various embodiments, the spacing or grating pitch of diffractive features in the diffraction gratings of the diffractive multibeam element may be sub-wavelength (i.e., less than a wavelength of the guided light).

While a multibeam element with a plurality of diffraction gratings is used as an illustrative example in the discussion that follows, in some embodiments other components may be used in multibeam element, such as at least one of a micro-reflective element and a micro-refractive element. For example, the micro-reflective element may include a triangular-shaped mirror, a trapezoid-shaped mirror, a pyramid-shaped mirror, a rectangular-shaped mirror, a hemispherical-shaped mirror, a concave mirror and/or a convex mirror. In some embodiments, a micro-refractive element may include a triangular-shaped refractive element, a trapezoid-shaped refractive element, a pyramid-shaped refractive element, a rectangular-shaped refractive element, a hemispherical-shaped refractive element, a concave refractive element and/or a convex refractive element.

According to various embodiments, the light beam plurality may represent a light field. For example, the light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field.

According to various embodiments, the different principal angular directions of the various light beams in the light beam plurality are determined by a characteristic including, but not limited to, a size (e.g., one or more of length, width, area, and etc.) of the diffractive multibeam element along with a 'grating pitch' or a diffractive feature spacing and an orientation of a diffraction grating within diffractive multibeam element. In some embodiments, the diffractive multibeam element may be considered an 'extended point light source', i.e., a plurality of point light sources distributed across an extent of the diffractive multibeam element, by definition herein. Further, a light beam produced by the diffractive multibeam element has a principal angular direction given by angular components $\{\theta, \phi\}$, by definition herein, and as described above with respect to FIG. 1B.

Herein a 'collimator' is defined as substantially any optical device or apparatus that is configured to collimate light. For example, a collimator may include, but is not limited to, a collimating mirror or reflector, a collimating lens, or various combinations thereof. In some embodiments, the collimator comprising a collimating reflector may have a reflecting surface characterized by a parabolic curve or shape. In another example, the collimating reflector may comprise a shaped parabolic reflector. By 'shaped parabolic' it is meant that a curved reflecting surface of the shaped parabolic reflector deviates from a 'true' parabolic curve in a manner determined to achieve a predetermined reflection characteristic (e.g., a degree of collimation). Similarly, a collimating lens may comprise a spherically shaped surface (e.g., a biconvex spherical lens).

In some embodiments, the collimator may be a continuous reflector or a continuous lens (i.e., a reflector or lens having a substantially smooth, continuous surface). In other embodiments, the collimating reflector or the collimating lens may comprise a substantially discontinuous surface such as, but not limited to, a Fresnel reflector or a Fresnel lens that provides light collimation. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape in one or both of two orthogonal directions that provides light collimation, according to some embodiments.

Herein, a 'collimation factor,' denoted a, is defined as a degree to which light is collimated. In particular, a collimation factor defines an angular spread of light rays within a collimated beam of light, by definition herein. For example, a collimation factor σ may specify that a majority of light rays in a beam of collimated light is within a particular angular spread (e.g., +/−σ degrees about a central or principal angular direction of the collimated light beam). The light rays of the collimated light beam may have a Gaussian distribution in terms of angle and the angular spread may be an angle determined at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein, the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Further, as used herein, the article 'a' is intended to have its ordinary meaning in the patent arts, namely 'one or more'. For example, 'an element' means one or more elements and as such, 'the element' means 'the element(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
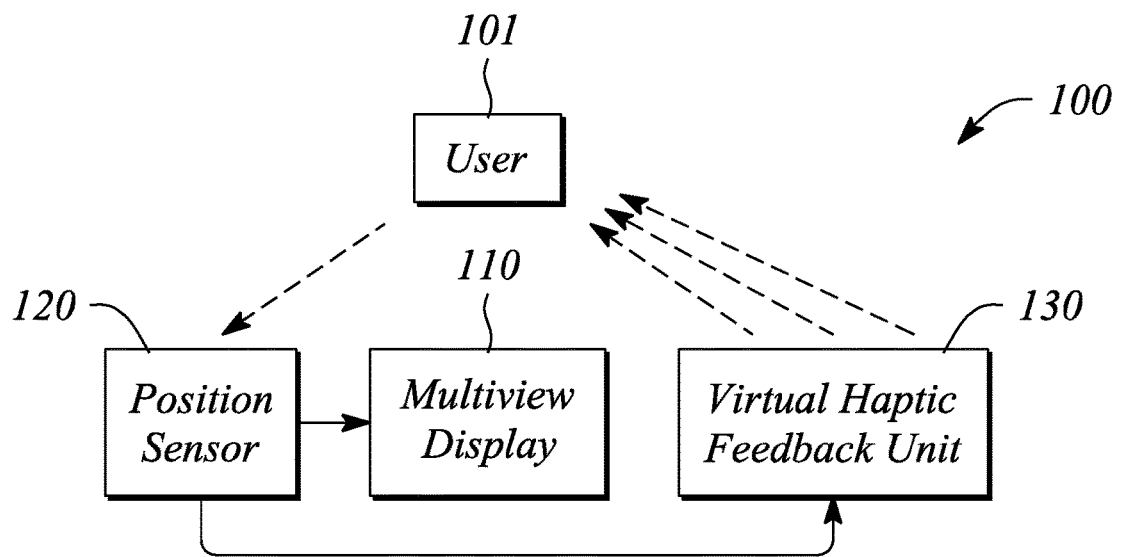
FIG. 3A illustrates a block diagram of a holographic reality system in an example, according to an embodiment consistent with the principles described herein.
Figure 3B:
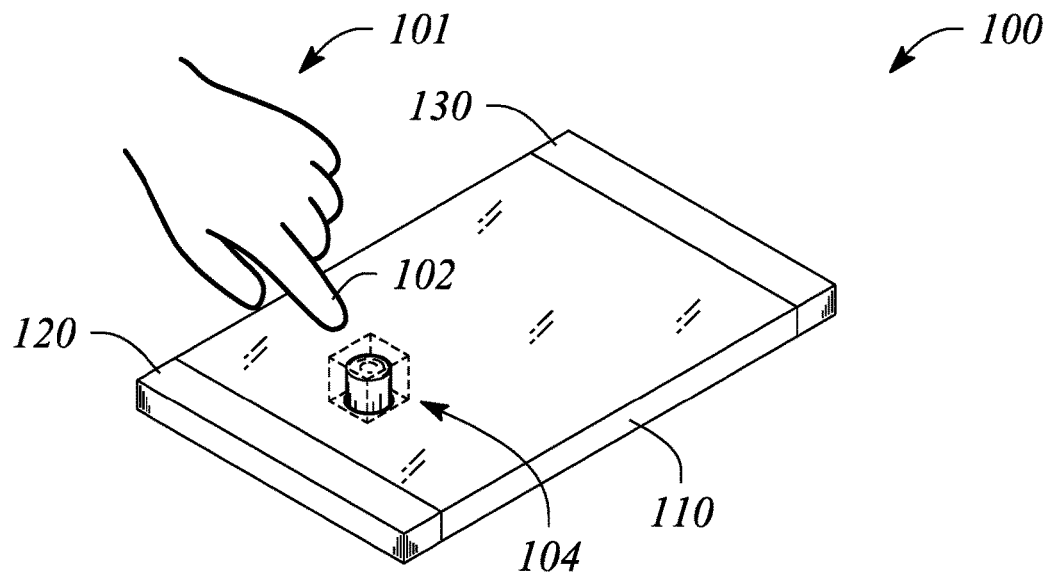
FIG. 3B illustrates a perspective view of a holographic reality system in an example, according to an embodiment consistent with the principles described herein.
Figure 3C:
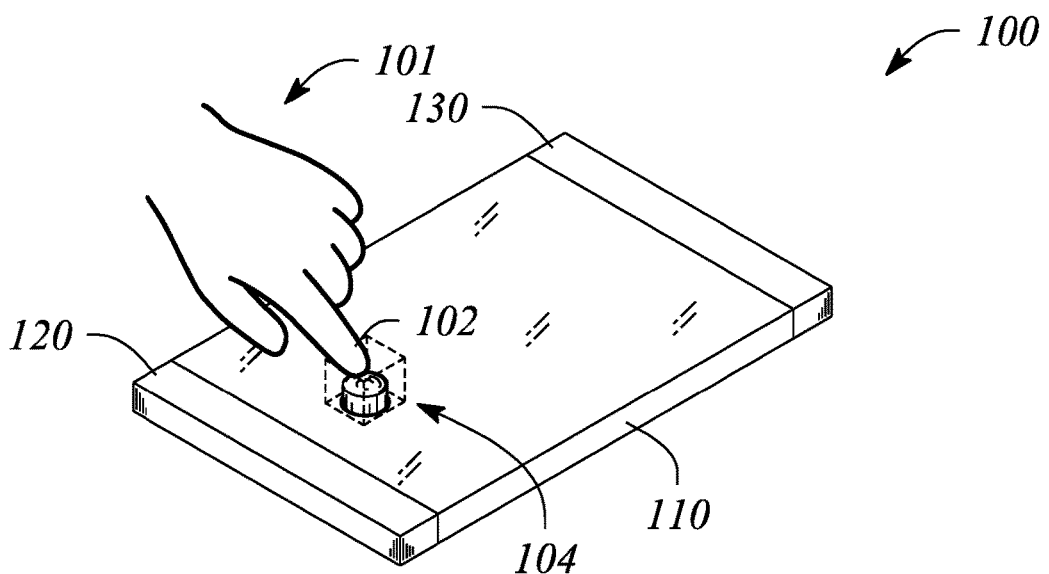
FIG. 3C illustrates a perspective view of the holographic reality system of FIG. 3B in another example, according to an embodiment consistent with the principles described herein.

According to embodiments of the principles described herein, a holographic reality system is provided. FIG. 3A illustrates a block diagram of a holographic reality system 100 in an example, according to an embodiment consistent with the principles described herein. FIG. 3B illustrates a perspective view of a holographic reality system 100 in an example, according to an embodiment consistent with the principles described herein. FIG. 3C illustrates a perspective view of the holographic reality system 100 of FIG. 3B in another example, according to an embodiment consistent with the principles described herein.

According to various embodiments, the holographic reality system 100 is configured to display multiview content as multiview images. Further, the holographic reality system 100 facilitates interaction with the multiview content using a combination of contactless or 'virtual' user input and contactless or 'virtual' haptic feedback to the user of the holographic reality system 100 (i.e., the 'user' hereinafter). In particular, a user may modify or otherwise interact with the multiview content through a virtual control within the multiview image using the virtual user input and virtual haptic feedback. In addition, the holographic reality system 100 is configured to provide the virtual haptic feedback having an extent corresponding to an extent (i.e., location, size and shape) of the virtual control within the multiview image. As such, the virtual haptic feedback may provide to the user a sensation of physical interaction with the virtual control without actual or physical contact between the user and the holographic reality system 100, according to various embodiments.

As illustrated in FIG. 3A, the holographic reality system 100 comprises a multiview display 110. The multiview display 110 is configured to display the multiview content as the multiview image. In particular, the displayed multiview image is configured to be viewed by a user 101 of the holographic reality system 100. According to various embodiments, the multiview display 110 may be substantially any electronic display capable of displaying the multiview content as the multiview image. For example, the multiview display 110 may be or include, but is not limited to, various electronic displays of or used in a cellular telephone or a smartphone, a tablet computer, a laptop computer, a notebook computer, a personal or desktop computer, a netbook computer, a media player device, an electronic book device, a smart watch, a wearable computing device, a portable computing device, a consumer electronic device, and a display headset (such as, but not limited to, a virtual-reality headset). In some embodiments (e.g., described below with reference to FIG. 4A-4C) the multiview display 110 may be a holographic reality multiview display that employs multibeam elements configured to provide a plurality of directional light beams as well as an array of light valves configured to modulate the directional light beams as view pixels of different views of the multiview image.

The holographic reality system 100 illustrated in FIG. 3A further comprises a position sensor 120. The position sensor 120, or more generally a measurement subsystem that includes the position sensor 120, is configured to monitor a position of a user 101. For example, the position sensor 120 may be configured to monitor a position of a hand or one or more digits of the hand of the user 101 of the holographic reality system 100. In other embodiments, the position sensor 120 may monitor, but is not limited to monitoring, a position of a head of the user 101, a position of an eye of the user 101, and a position of an object held by the user 101. For simplicity of discussion herein, the term 'hand' of the user 101 is described with an understanding that the hand may represent any physical part or condition of the user 101 that may be monitored. In particular, the term 'hand' will be understood to at least include an entire hand as well as one or more digits of the hand, by definition herein. Further by definition herein, monitoring a 'position' includes, but is not limited to, monitoring a location and monitoring a relative motion. FIGS. 3B-3C illustrate a hand 102 of the user 101 that may be monitored by the position sensor 120, by way of example and not limitation.

According to various embodiments, the position sensor 120 may comprise one or more devices or sensors (which are sometimes referred to as 'sensing module(s)' or 'sensing unit(s)') configured to perform position measurements, such as measurements to detect a one or both of a position and a motion of the hand 102 of the user 101 of the holographic reality system 100. According to various embodiments, one or both of position and motion measurements of the hand of a user 101 may be performed with or without direct contact between the user 101 and the holographic reality system 100. Measurements performed by the position sensor 120 without physical contact are sometimes referred to as 'virtual interactions' or 'indirect interactions' or 'touchless interactions,' for example. Monitoring the user position without direct or physical contact is depicted in FIG. 3A is illustrated using a dashed arrow.

According to some embodiments (e.g., specifically to facilitate virtual or indirect interaction), the position sensor 120 may comprise any of a number of different sensors including, but not limited to, a capacitive sensor, a plurality of image sensors (such as a camera or a CMOS or a CCD image sensor), and a time-of-flight sensor configured to measure one or both of the position and motion of the hand of the user 101. According to various embodiments, the capacitive sensor is configured to measure or determine one or both of the location and the motion of the hand using a change in capacitance. For example, the capacitive sensor may detect the position or the motion of the hand based on changes in a capacitance of the capacitive sensor induced by the proximity of the hand or digits of the user 101. According to various embodiments, the plurality of image sensors may determine or measure one or both of the position and the motion of the hand by employing image processing of images captured by the image sensor plurality. For example, two or more image sensors having different fields or view or perspectives of the hand may capture images of the hand. Analysis of the captured images (e.g., using image processing) may be used to determine the position or the motion of the hand of the user 101 (e.g., using a comparison of the images captured from the different perspectives). According to various embodiments, the time-of-flight sensor may employ a wireless signal including, but not limited to, one or more of an acoustic signal, a radio frequency (RF), a microwave signal, an acoustic signal, an infrared signal, and another optical signal (e.g., in one or both of the visible or ultraviolet wavelengths) to monitor the position or the motion of the hand. For example, the time-of-fight sensor may transmit the wireless signal, which upon reflection from the hand may be used to determine the position or the motion based on a length of time the wireless signal takes to make a round trip between the hand and the time-of-flight sensor.

In some embodiments, the position sensor 120 (or the measurement subsystem that includes the position sensor 120) may further include sensors to determine one or both of a motion and an orientation of the holographic reality system 100. For example, the position sensor 120 may comprise one or more of a gyroscope, an accelerometer configured to measure one or both of the motion and the orientation of the holographic reality system 100. In some embodiments, the position of the hand may be inferred from one or both of the measured motion and the measured orientation, for example. In yet other embodiments, the position sensor 120 may comprise or further comprise a 'touch' sensor such as, but not limited to, physical buttons, physical switches, and a touch sensitive display screen (e.g., a capacitive touch screen of the multiview display 110).

According to various embodiments, the holographic reality system 100 illustrated in FIG. 3A further comprises a virtual haptic feedback unit 130. The virtual haptic feedback unit 130 is configured to provide virtual haptic feedback to the user 101. In particular, the virtual haptic feedback is provided to the user 101 without physical contact between the user 101 and the holographic reality system 100. Further, an extent of the virtual haptic feedback corresponds to an extent of a virtual control within the multiview image, according to various embodiments. Providing virtual haptic feedback to the user 101 without physical contact is depicted in FIG. 3A using a plurality of dashed arrows focused in the user 101.

FIGS. 3B and 3C illustrate a virtual control 104 as a three-dimensional button displayed on the multiview display 110 of the holographic reality system 100, e.g., as part of the multiview image. The virtual control 104 has a location, a size (e.g., L×W×H) and a shape, as illustrated using a dashed outline. The extent of the virtual haptic feedback may correspond to the location, size and shape of the virtual control 104. According to various embodiments, if the hand 102 of the user 101 is located within the extent of the virtual control 104, the user 101 may feel, sense or otherwise perceive a contact with the virtual control 104 as a result of the virtual haptic feedback. For example, virtual haptic feedback unit 130 may provide the virtual haptic feedback using one or more of ultrasound or using ultrasonic pressure, air pressure, or electrostatic charge, among other things, to provide contactless or virtual haptic feedback. The extent of the ultrasonic pressure, air pressure, or electrostatic charge may be configured to correspond to the extent (e.g., visual extent) of the virtual control 104, for example.

According to various embodiments, position or motion measurements provided by the position sensor 120 may be used to modify the multiview content of the multiview image displayed on the multiview display 110. For example as illustrated in FIGS. 3B-3C, the multiview display 110 may be configured to provide a visual indication of a command using the virtual control 104. The position or motion of the hand provided by the position sensor 120 may correspond to a gesture or control input. An effect of the gesture may be provided as a modification of the multiview content by changing one or more of the location, size and shape of the virtual control 104. For example, in FIG. 3B, the virtual control 104 is illustrate prior to the gesture (e.g., the hand pressing the virtual control 104). In FIG. 3C the virtual control 104 is depicted following the gesture. As illustrated, the virtual control 104 has been depressed to visually indicate to the user 101 interface that a command input has occurred. As such, the multiview display 110 may provide a visual indication of the entry of the command corresponding to the gesture by modifying the displayed multiview content. Further, the virtual haptic feedback provided by the virtual haptic feedback unit 130 may simulate a physical indication of the entry of the command that provides modification of the multiview content. Modification of the multiview content may include, but are not limited to, pinching the multiview content, rotating the multiview content, displacing the multiview content, and deforming or compressing the multiview content, e.g., depressing the virtual control 104, as in FIG. 3C.

As discussed above, the virtual haptic feedback unit 130 may provide information to the user 101 about the response to the command, such as activation of a virtual icon (e.g., the virtual control 104) in the multiview content in response to the monitored position or motion. For example, the virtual haptic feedback unit 130 may provide the virtual haptic feedback using ultrasound or ultrasonic pressure, air pressure, or electrostatic charge, as mentioned above. Notably, the ultrasonic pressure, air pressure, or electrostatic charge may provide a force to the hand of the user 101 so that it 'feels' as if the user 101 had physically and directly depressed the virtual control 104, for example. The virtual haptic feedback provided by way of the force to the hand may afford the user 101 with a perception of touching and interacting with the virtual control 104 even though the user 101 is not, in fact, in direct contact with the holographic reality system 100 (i.e., the multiview display 110 or the virtual control 104 displayed thereon), according to various embodiments. Note that the virtual haptic feedback may be provided by the virtual haptic feedback unit 130 concurrently with the modification of the displayed multiview content, so that the holographic reality system 100 provides integrated and intuitive feedback to the user 101 about the response to the gesture or command input.

In some embodiments, the modification of the displayed multiview content may be also based on one or more of a position of the user 101 relative to the holographic reality system 100, a gaze direction of the user 101, and head tracking. For example, the holographic reality system 100 may track or monitor the position of the user 101 relative to the holographic reality system 100. Moreover, in some embodiments, the modification of the multiview content may be further based, at least in part, on a condition of the holographic reality system 100 including, but not limited to, a monitored orientation of the holographic reality system 100. For example, the orientation may be monitored using one or more of a gyroscope, an accelerometer, and another type of orientation measurement (such as analysis of an image acquired using a camera or an image sensor). Thus, the modification of the displayed multiview content may be based both on measurements performed using the position sensor 120 and a monitored orientation of the holographic reality system 100, according to some embodiments.

In some embodiments, the modification of the multiview content further may be based, at least in part, on content that is to be presented on the multiview display 110 of the holographic reality system 100. For example, if the content includes a panoramic scene having a wide width or axis, the multiview content displayed by the holographic reality system 100 may be modified to provide a larger number of views along the width or axis. More generally, the content may be analyzed to determine an information spatial density along one or more different axes (such as a length and a width), and the displayed multiview content may be modified to provide a larger number of views along an axis with the highest information spatial density.

In some embodiments (not explicitly illustrated in FIG. 3A), the holographic reality system 100 may further comprise a processing subsystem, a memory subsystem, a power subsystem, and a networking subsystem. The processing subsystem may include one or more devices configured to perform computational operations such as, but not limited to, a microprocessor, a graphics processing unit (GPU) or a digital signal processor (DSP). The memory subsystem may include one or more devices for storing one or both of data and instructions that may be used by the processing subsystem to provide and control operation the holographic reality system 100. For example, stored data and instructions may include, but are not limited to, data and instructions configured to one or more to display the multiview content on the multiview display 110 as the multiview image, to process the multiview content or the multiview image(s) to be displayed, to control the multiview content in response to inputs including the location of the hand of the user 101 representing control gestures, and to provide the virtual haptic feedback via the virtual haptic feedback unit 130. For example, memory subsystem may include one or more types of memory including, but not limited to, random access memory (RAM), read-only memory (ROM), and various forms of flash memory.

In some embodiments, instructions stored in the memory subsystem and used by the processing subsystem include, but are not limited to program instructions or sets of instructions and an operating system, for example. The program instructions and operating system may be executed by processing subsystem during operation of the holographic reality system 100, for example. Note that the one or more computer programs may constitute a computer-program mechanism, a computer-readable storage medium or software. Moreover, instructions in the various modules in memory subsystem may be implemented in one or more of a high-level procedural language, an object-oriented programming language, and in an assembly or machine language. Furthermore, the programming language may be compiled or interpreted, e.g., configurable or configured (which may be used interchangeably in this discussion), to be executed by processing subsystem, according to various embodiments.

In various embodiments, the power subsystem may include one or more energy storage components (such as a battery) configured to provide power to other components in the holographic reality system 100. The networking subsystem may include one or more devices and subsystem or modules configured to couple to and communicate on one or both of a wired and a wireless network (i.e., to perform network operations). For example, networking subsystem may include any or all of a Bluetooth™ networking system, a cellular networking system (e.g., a 3G/4G/5G network such as UMTS, LTE, etc.), a universal serial bus (USB) networking system, a networking system based on the standards described in IEEE 802.12 (e.g., a WiFi networking system), an Ethernet networking system.

Note that, while some of the operations in the preceding embodiments may be implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the display technique may be implemented using program instructions, the operating system (such as a driver for display subsystem) or in hardware.

Figure 4A:
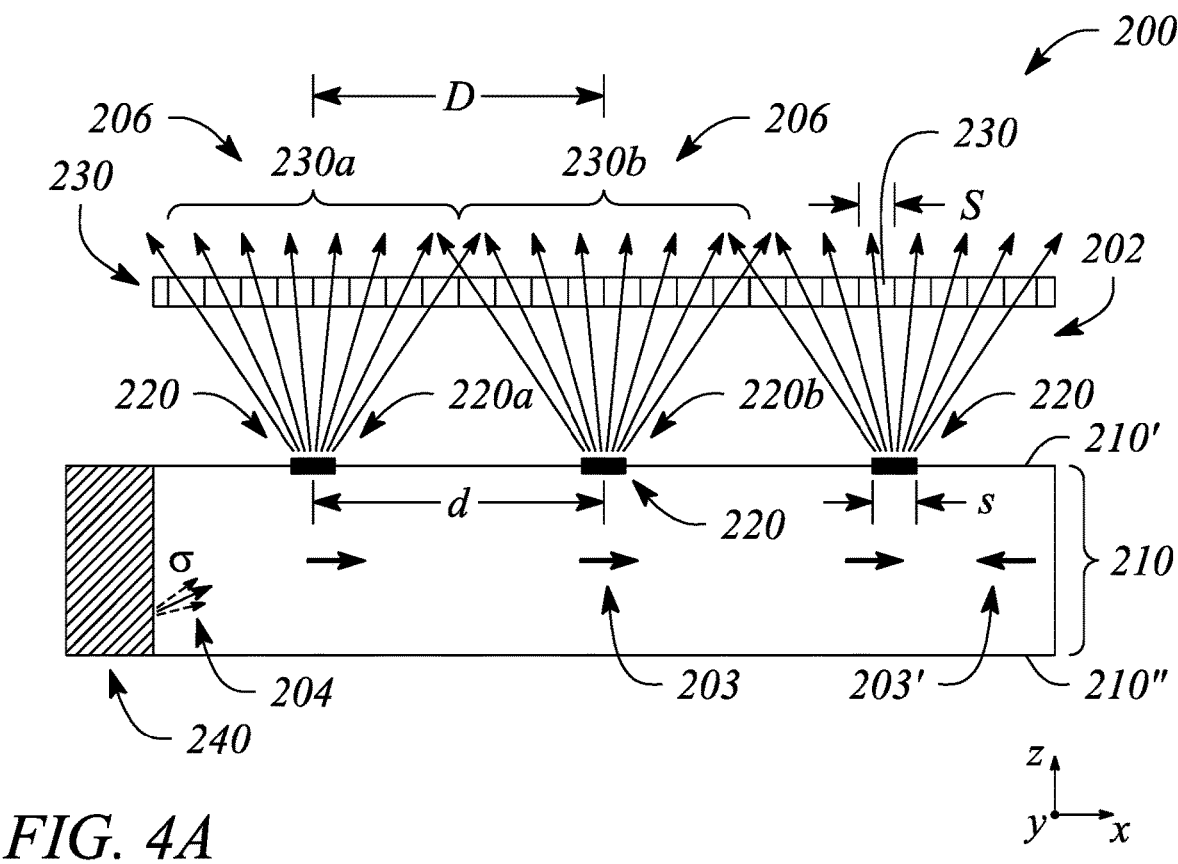
FIG. 4A illustrates a cross sectional view of a multiview display in an example, according to an embodiment consistent with the principles described herein.
Figure 4B:
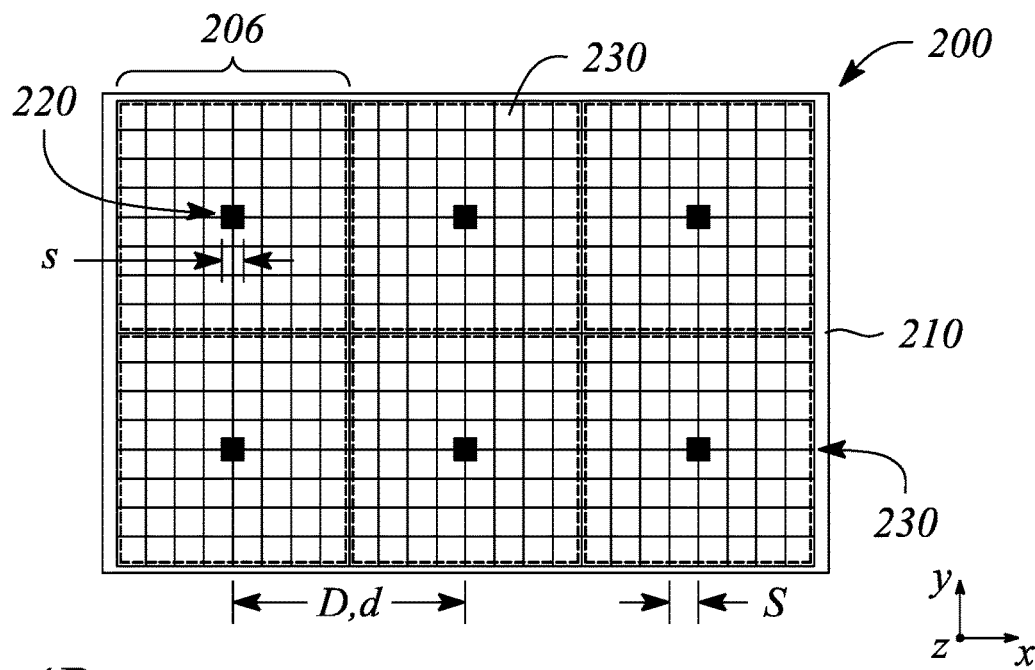
FIG. 4B illustrates a plan view of a multiview display in an example, according to an embodiment consistent with the principles described herein.
Figure 4C:
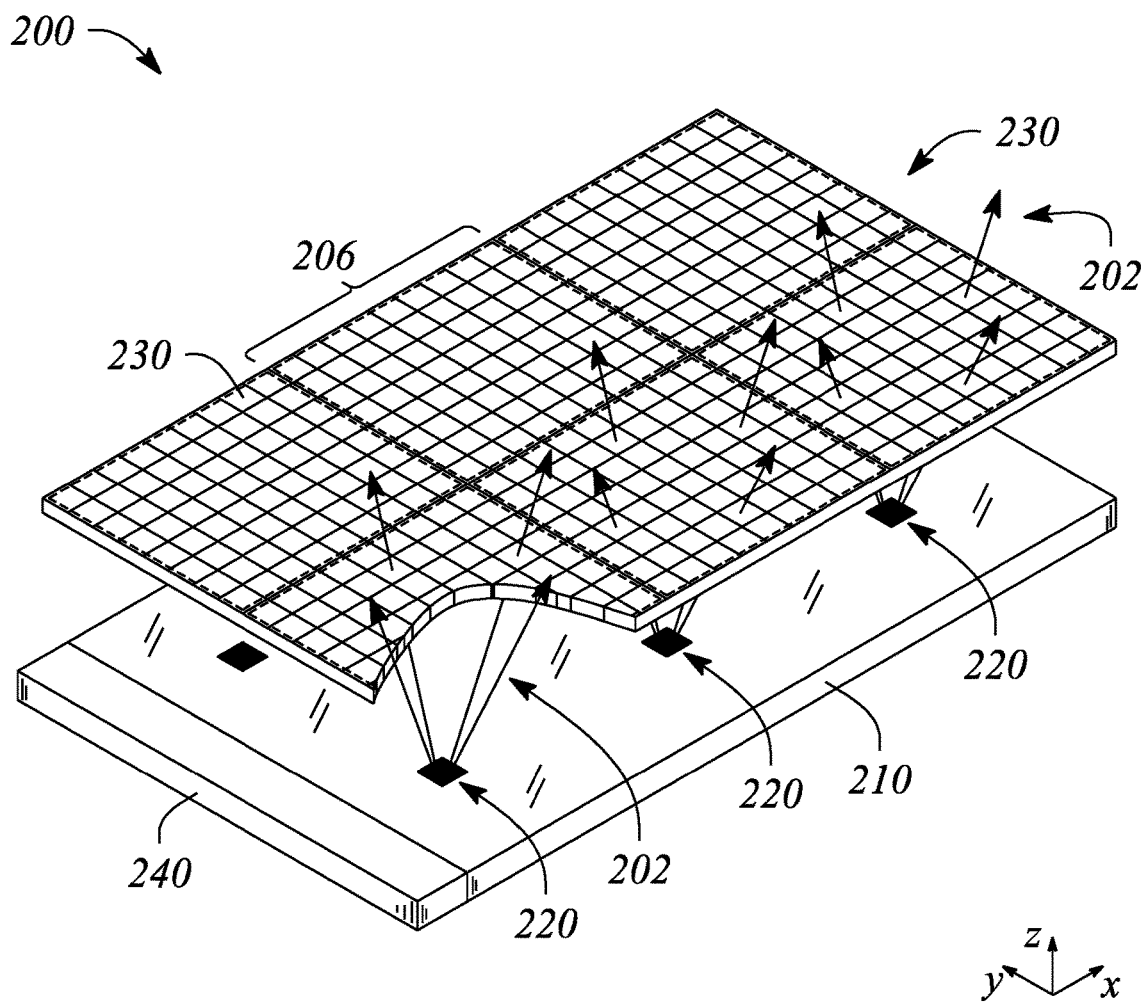
FIG. 4C illustrates a perspective view of a multiview display in an example, according to an embodiment consistent with the principles described herein.

FIG. 4A illustrates a cross sectional view of a multiview display 200 in an example, according to an embodiment consistent with the principles described herein. FIG. 4B illustrates a plan view of a multiview display 200 in an example, according to an embodiment consistent with the principles described herein. FIG. 4C illustrates a perspective view of a multiview display 200 in an example, according to an embodiment consistent with the principles described herein. The perspective view in FIG. 4C is illustrated with a partial cut-away to facilitate discussion herein only. The multiview display 200 illustrated in FIGS. 4A-4C may be employed as the multiview display 110 of the holographic reality system 100, according to some embodiments.

As illustrated in FIGS. 4A-4C, the multiview display 200 is configured to provide a plurality of directional light beams 202 having different principal angular directions from one another (e.g., as a light field). In particular, the provided plurality of directional light beams 202 may be scattered out and directed away from the multiview display 200 in different principal angular directions corresponding to respective view directions of a multiview display, according to various embodiments. In some embodiments, the directional light beams 202 may be modulated (e.g., using light valves, as described below) to facilitate the display of information having multiview content, e.g., a multiview image. FIGS. 4A-4C also illustrate a multiview pixel 206 comprising sub-pixels and an array of light valves 230, which are described in further detail below.

As illustrated in FIGS. 4A-4C, the multiview display 200 comprises a light guide 210. The light guide 210 is configured to guide light along a length of the light guide 210 as guided light 204 (i.e., a guided light beam). For example, the light guide 210 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 204 according to one or more guided modes of the light guide 210, for example.

In some embodiments, the light guide 210 may be a slab or plate optical waveguide (i.e., a plate light guide) comprising an extended, substantially planar sheet of optically transparent, dielectric material. The substantially planar sheet of dielectric material is configured to guide the guided light 204 using total internal reflection. According to various examples, the optically transparent material of the light guide 210 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 210 may further include a cladding layer (not illustrated) on at least a portion of a surface (e.g., one or both of the top surface and the bottom surface) of the light guide 210. The cladding layer may be used to further facilitate total internal reflection, according to some examples.

Further, according to some embodiments, the light guide 210 is configured to guide the guided light 204 (e.g., as a guided light beam) according to total internal reflection at a non-zero propagation angle between a first surface 210' (e.g., 'front' surface or side) and a second surface 210" (e.g., 'back' surface or side) of the light guide 210. In particular, the guided light 204 propagates by reflecting or 'bouncing' between the first surface 210' and the second surface 210" of the light guide 210 at the non-zero propagation angle. In some embodiments, the guided light 204 as a plurality of guided light beams comprising different colors of light may be guided by the light guide 210, each guided light beam being guided a at respective one of a plurality of different color-specific, non-zero propagation angles. The non-zero propagation angle is not illustrated in FIGS. 4A-4C for simplicity of illustration. However, a bold arrow depicts a propagation direction 203 of the guided light 204 along the light guide length in FIG. 4A.

As defined herein, a 'non-zero propagation angle' is an angle relative to a surface (e.g., the first surface 210' or the second surface 210") of the light guide 210. Further, the non-zero propagation angle is both greater than zero and less than a critical angle of total internal reflection within the light guide 210, according to various embodiments. For example, the non-zero propagation angle of the guided light 204 may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees. Moreover, a specific non-zero propagation angle may be chosen (e.g., arbitrarily) for a particular implementation as long as the specific non-zero propagation angle is chosen to be less than the critical angle of total internal reflection within the light guide 210.

The guided light 204 in the light guide 210 may be introduced or coupled into the light guide 210 at the non-zero propagation angle (e.g., about 30-35 degrees). In some examples, a coupling structure such as, but not limited to, a lens, a mirror or similar reflector (e.g., a tilted collimating reflector), a diffraction grating, and a prism as well as various combinations thereof may facilitate coupling light into an input end of the light guide 210 as the guided light 204 at the non-zero propagation angle. In other examples, light may be introduced directly into the input end of the light guide 210 either without or substantially without the use of a coupling structure (i.e., direct or 'butt' coupling may be employed). Once coupled into the light guide 210, the guided light 204 is configured to propagate along the light guide 210 in a propagation direction 203 that may be generally away from the input end (e.g., illustrated by bold arrows pointing along an x-axis in FIG. 4A).

Further, the guided light 204, or equivalently the guided light 204, produced by coupling light into the light guide 210 may be a collimated light beam, according to various embodiments. Herein, a 'collimated light' or a 'collimated light beam' is generally defined as a beam of light in which rays of the light beam are substantially parallel to one another within the light beam (e.g., the guided light 204). Also by definition herein, rays of light that diverge or are scattered from the collimated light beam are not considered to be part of the collimated light beam. In some embodiments (not illustrated), the multiview display 200 may include a collimator, such as a lens, reflector or mirror, as described above, (e.g., tilted collimating reflector) to collimate the light, e.g., from a light source. In some embodiments, the light source itself comprises a collimator. The collimated light provided to the light guide 210 is a collimated guided light beam. The guided light 204 may be collimated according to or having a collimation factor σ, in some embodiments. Alternatively, the guided light 204 may be uncollimated, in other embodiments.

In some embodiments, the light guide 210 may be configured to 'recycle' the guided light 204. In particular, the guided light 204 that has been guided along the light guide length may be redirected back along that length in another propagation direction 203' that differs from the propagation direction 203. For example, the light guide 210 may include a reflector (not illustrated) at an end of the light guide 210 opposite to an input end adjacent to the light source. The reflector may be configured to reflect the guided light 204 back toward the input end as recycled guided light. In some embodiments, another light source may provide guided light 204 in the other propagation direction 203' instead of or in addition to light recycling (e.g., using a reflector). One or both of recycling the guided light 204 and using another light source to provide guided light 204 having the other propagation direction 203' may increase a brightness of the multiview display 200 (e.g., increase an intensity of the directional light beams 202) by making guided light available more than once, for example, to multibeam elements, described below. In FIG. 4A, a bold arrow indicating a propagation direction 203' of recycled guided light (e.g., directed in a negative x-direction) illustrates a general propagation direction of the recycled guided light within the light guide 210.

As illustrated in FIGS. 4A-4C, the multiview display 200 further comprises a plurality of multibeam elements 220 spaced apart from one another along the light guide length. In particular, the multibeam elements 220 of the plurality are separated from one another by a finite space and represent individual, distinct elements along the light guide length. That is, by definition herein, the multibeam elements 220 of the plurality are spaced apart from one another according to a finite (i.e., non-zero) inter-element distance (e.g., a finite center-to-center distance). Further, the multibeam elements 220 of the plurality generally do not intersect, overlap or otherwise touch one another, according to some embodiments. That is, each multibeam element 220 of the plurality is generally distinct and separated from other ones of the multibeam elements 220.

According to some embodiments, the multibeam elements 220 of the plurality may be arranged in either a one-dimensional (1D) array or a two-dimensional (2D) array. For example, the multibeam elements 220 may be arranged as a linear 1D array. In another example, the multibeam elements 220 may be arranged as a rectangular 2D array or as a circular 2D array. Further, the array (i.e., 1D or 2D array) may be a regular or uniform array, in some examples. In particular, an inter-element distance (e.g., center-to-center distance or spacing) between the multibeam elements 220 may be substantially uniform or constant across the array. In other examples, the inter-element distance between the multibeam elements 220 may be varied one or both of across the array and along the length of the light guide 210.

According to various embodiments, a multibeam element 220 of the multibeam element plurality is configured to provide, couple out or scatter out a portion of the guided light 204 as the plurality of directional light beams 202. For example, the guided light portion may be coupled out or scattered out using one or more of diffractive scattering, reflective scattering, and refractive scattering or coupling, according to various embodiments. FIGS. 4A and 4C illustrate the directional light beams 202 as a plurality of diverging arrows depicted directed way from the first (or front) surface 210' of the light guide 210. Further, according to various embodiments, a size of the multibeam element 220 is comparable to a size of a sub-pixel (or equivalently a light valve 230) of a multiview pixel 206, as defined above and further described below and illustrated in FIGS. 4A-4C. Herein, the 'size' may be defined in any of a variety of manners to include, but not be limited to, a length, a width or an area. For example, the size of a sub-pixel or a light valve 230 may be a length thereof and the comparable size of the multibeam element 220 may also be a length of the multibeam element 220. In another example, the size may refer to an area such that an area of the multibeam element 220 may be comparable to an area of the sub-pixel (or the light value 230).

In some embodiments, the size of the multibeam element 220 is comparable to the sub-pixel size such that the multibeam element size is between about fifty percent (50%) and about two hundred percent (200%) of the sub-pixel size. For example, if the multibeam element size is denoted 's' and the sub-pixel size is denoted 'S' (e.g., as illustrated in FIG. 4A), then the multibeam element size s may be given by $$\frac{1}{2}S \le s \le 2S$$

In other examples, the multibeam element size is in a range that is greater than about sixty percent (60%) of the sub-pixel size, or greater than about seventy percent (70%) of the sub-pixel size, or greater than about eighty percent (80%) of the sub-pixel size, or greater than about ninety percent (90%) of the sub-pixel size, and that is less than about one hundred eighty percent (180%) of the sub-pixel size, or less than about one hundred sixty percent (160%) of the sub-pixel size, or less than about one hundred forty (140%) of the sub-pixel size, or less than about one hundred twenty percent (120%) of the sub-pixel size. For example, by 'comparable size', the multibeam element size may be between about seventy-five percent (75%) and about one hundred fifty (150%) of the sub-pixel size. In another example, the multibeam element 220 may be comparable in size to the sub-pixel where the multibeam element size is between about one hundred twenty-five percent (125%) and about eighty-five percent (85%) of the sub-pixel size. According to some embodiments, the comparable sizes of the multibeam element 220 and the sub-pixel may be chosen to reduce, or in some examples to minimize, dark zones between views of the multiview display. Moreover, the comparable sizes of the multibeam element 220 and the sub-pixel may be chosen to reduce, and in some examples to minimize, an overlap between views (or view pixels) of the multiview display 200.

The multiview display 200 illustrated in FIGS. 4A-4C further comprises the array of light valves 230 configured to modulate the directional light beams 202 of the directional light beam plurality. As illustrated in FIGS. 4A-4C, different ones of the directional light beams 202 having different principal angular directions pass through and may be modulated by different ones of the light valves 230 in the light valve array. Further, as illustrated, a light valve 230 of the array corresponds to a sub-pixel of the multiview pixel 206, and a set of the light valves 230 corresponds to a multiview pixel 206 of the multiview display. In particular, a different set of light valves 230 of the light valve array is configured to receive and modulate the directional light beams 202 from a corresponding one of the multibeam elements 220, i.e., there is one unique set of light valves 230 for each multibeam element 220, as illustrated. In various embodiments, different types of light valves may be employed as the light valves 230 of the light valve array including, but not limited to, one or more of liquid crystal light valves, electrophoretic light valves, and light valves based on electrowetting.

As illustrated in FIG. 4A, a first light valve set 230a is configured to receive and modulate the directional light beams 202 from a first multibeam element 220a. Further, a second light valve set 230b is configured to receive and modulate the directional light beams 202 from a second multibeam element 220b. Thus, each of the light valve sets (e.g., the first and second light valve sets 230a, 230b) in the light valve array corresponds, respectively, both to a different multibeam element 220 (e.g., elements 220a, 220b) and to a different multiview pixel 206, with individual light valves 230 of the light valve sets corresponding to the sub-pixels of the respective multiview pixels 206, as illustrated in FIG. 4A.

In some embodiments, a relationship between the multibeam elements 220 and corresponding multiview pixels 206 (i.e., sets of sub-pixels and corresponding sets of light valves 230) may be a one-to-one relationship. That is, there may be an equal number of multiview pixels 206 and multibeam elements 220. FIG. 4B explicitly illustrates by way of example the one-to-one relationship where each multiview pixel 206 comprising a different set of light valves 230 (and corresponding sub-pixels) is illustrated as surrounded by a dashed line. In other embodiments (not illustrated), a number of multiview pixels 206 and a number of multibeam elements 220 may differ from one another.

In some embodiments, an inter-element distance (e.g., center-to-center distance) between a pair of multibeam elements 220 of the plurality may be equal to an inter-pixel distance (e.g., a center-to-center distance) between a corresponding pair of multiview pixels 206, e.g., represented by light valve sets. For example, as illustrated in FIG. 4A, a center-to-center distance d between the first multibeam element 220a and the second multibeam element 220b is substantially equal to a center-to-center distance D between the first light valve set 230a and the second light valve set 230b. In other embodiments (not illustrated), the relative center-to-center distances of pairs of multibeam elements 220 and corresponding light valve sets may differ, e.g., the multibeam elements 220 may have an inter-element spacing (i.e., center-to-center distance d) that is one of greater than or less than a spacing (i.e., center-to-center distance D) between light valve sets representing multiview pixels 206.

In some embodiments, a shape of the multibeam element 220 is analogous to a shape of the multiview pixel 206 or equivalently, to a shape of a set (or 'sub-array') of the light valves 230 corresponding to the multiview pixel 206. For example, the multibeam element 220 may have a square shape and the multiview pixel 206 (or an arrangement of a corresponding set of light valves 230) may be substantially square. In another example, the multibeam element 220 may have a rectangular shape, i.e., may have a length or longitudinal dimension that is greater than a width or transverse dimension. In this example, the multiview pixel 206 (or equivalently the arrangement of the set of light valves 230) corresponding to the multibeam element 220 may have an analogous rectangular shape. FIG. 4B illustrates a top or plan view of square-shaped multibeam elements 220 and corresponding square-shaped multiview pixels 206 comprising square sets of light valves 230. In yet other examples (not illustrated), the multibeam elements 220 and the corresponding multiview pixels 206 have various shapes including or at least approximated by, but not limited to, a triangular shape, a hexagonal shape, and a circular shape. Therefore, in these embodiments, there may not, in general, be a relationship between the shape of the multibeam element 220 and the shape of the multiview pixel 206.

Further (e.g., as illustrated in FIG. 4A), each multibeam element 220 is configured to provide directional light beams 202 to one and only one multiview pixel 206 at a given time based on the set of sub-pixels that are currently assigned to a particular multiview pixel 206, according to some embodiments. In particular, for a given one of the multibeam elements 220 and a current assignment of the set of sub-pixels to a particular multiview pixel 206, the directional light beams 202 having different principal angular directions corresponding to the different views of the multiview display are substantially confined to the single corresponding multiview pixel 206 and the sub-pixels thereof, i.e., a single set of light valves 230 corresponding to the multibeam element 220, as illustrated in FIG. 4A. As such, each multibeam element 220 of the multiview display 200 provides a corresponding set of directional light beams 202 that has a set of the different principal angular directions corresponding to the current different views of the multiview display (i.e., the set of directional light beams 202 contains a light beam having a direction corresponding to each of the current different view directions).

Referring again to FIG. 4A, the multiview display 200 further comprises a light source 240. According to various embodiments, the light source 240 is configured to provide the light to be guided within light guide 210. In particular, the light source 240 may be located adjacent to an entrance surface or end (input end) of the light guide 210. In various embodiments, the light source 240 may comprise substantially any source of light (e.g., optical emitter) including, but not limited to, an LED, a laser (e.g., laser diode) or a combination thereof. In some embodiments, the light source 240 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source 240 may be a substantially broadband light source configured to provide substantially broadband or polychromatic light. For example, the light source 240 may provide white light. In some embodiments, the light source 240 may comprise a plurality of different optical emitters configured to provide different colors of light. The different optical emitters may be configured to provide light having different, color-specific, non-zero propagation angles of the guided light corresponding to each of the different colors of light.

In some embodiments, the light source 240 may further comprise a collimator. The collimator may be configured to receive substantially uncollimated light from one or more of the optical emitters of the light source 240. The collimator is further configured to convert the substantially uncollimated light into collimated light. In particular, the collimator may provide collimated light having the non-zero propagation angle and being collimated according to a predetermined collimation factor, according to some embodiments. Moreover, when optical emitters of different colors are employed, the collimator may be configured to provide the collimated light having one or both of different, color-specific, non-zero propagation angles and having different color-specific collimation factors. The collimator is further configured to communicate the collimated light beam to the light guide 210 to propagate as the guided light 204, described above.

In some embodiments, the multiview display 200 is configured to be substantially transparent to light in a direction through the light guide 210 orthogonal to (or substantially orthogonal) to a propagation direction 203, 203' of the guided light 204. In particular, the light guide 210 and the spaced apart multibeam elements 220 allow light to pass through the light guide 210 through both the first surface 210' and the second surface 210", in some embodiments. Transparency may be facilitated, at least in part, due to both the relatively small size of the multibeam elements 220 and the relative large inter-element spacing (e.g., one-to-one correspondence with the multiview pixels 206) of the multibeam element 220. Further, the multibeam elements 220 may also be substantially transparent to light propagating orthogonal to the light guide surfaces 210', 210", according to some embodiments.

Figure 5A:
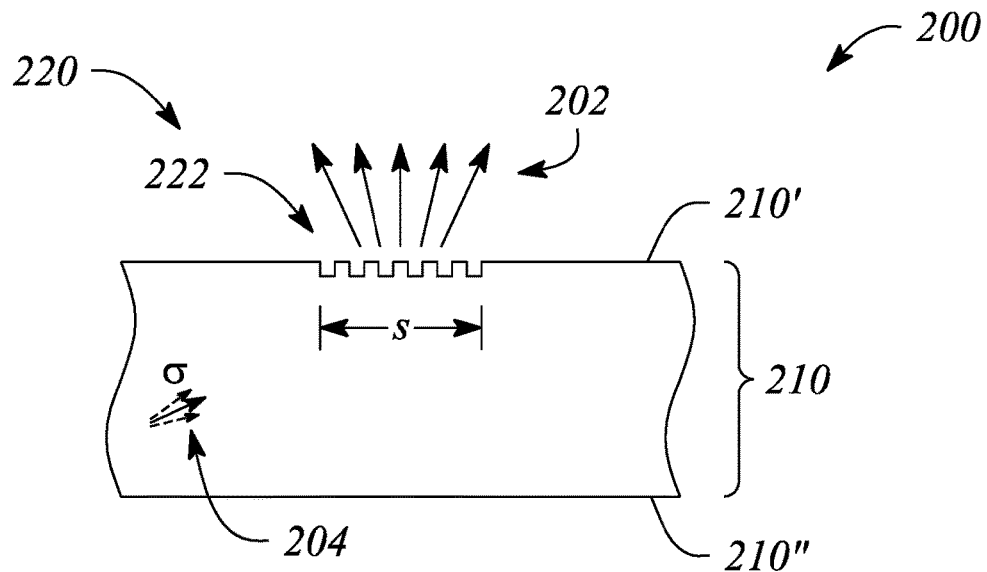
FIG. 5A illustrates a cross sectional view of a portion of a multiview display including a multibeam element in an example, according to an embodiment consistent with the principles described herein.
Figure 5B:
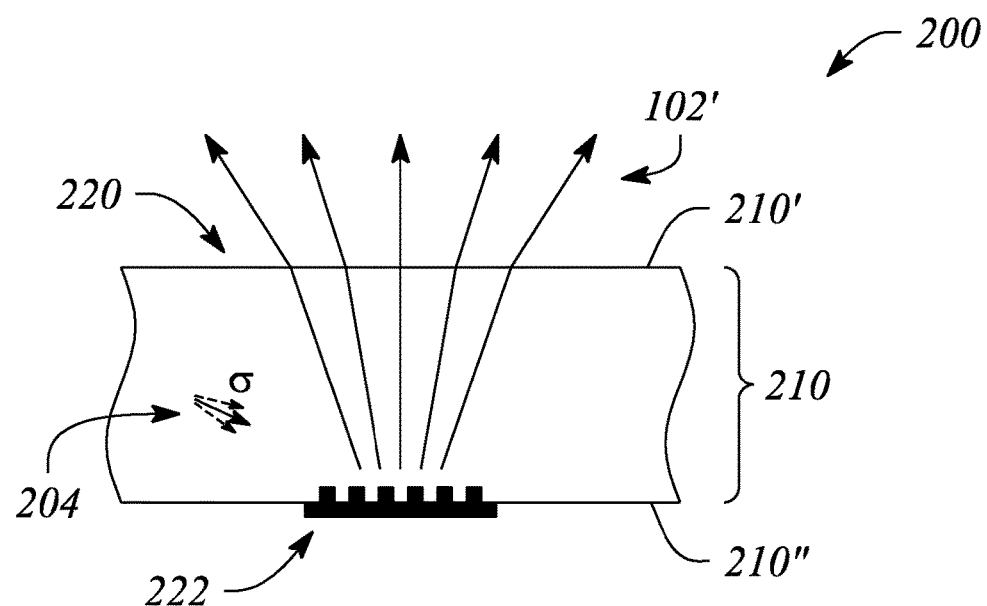
FIG. 5B illustrates a cross sectional view of a portion of a multiview display including a multibeam element in an example, according to another embodiment consistent with the principles described herein.

FIG. 5A illustrates a cross sectional view of a portion of a multiview display 200 including a multibeam element 220 in an example, according to an embodiment consistent with the principles described herein. FIG. 5B illustrates a cross sectional view of a portion of a multiview display 200 including a multibeam element 220 in an example, according to another embodiment consistent with the principles described herein. In particular, FIGS. 5A-5B illustrate the multibeam element 220 comprising a diffraction grating 222. The diffraction grating 222 is configured to diffractively scatter out a portion of the guided light 204 as the plurality of directional light beams 202. The diffraction grating 222 comprises a plurality of diffractive features spaced apart from one another by a diffractive feature spacing or a diffractive feature or grating pitch configured to provide diffractive coupling out of the guided light portion. According to various embodiments, the spacing or grating pitch of the diffractive features in the diffraction grating 222 may be sub-wavelength (i.e., less than a wavelength of the guided light).

In some embodiments, the diffraction grating 222 of the multibeam element 220 may be located at or adjacent to a surface of the light guide 210 of the multiview display 200. For example, the diffraction grating 222 may be at or adjacent to the first surface 210' of the light guide 210, as illustrated in FIG. 5A. The diffraction grating 222 at light guide first surface 210' may be a transmission mode diffraction grating configured to diffractively scatter out the guided light portion through the first surface 210' as the directional light beams 202. In another example, as illustrated in FIG. 5B, the diffraction grating 222 may be located at or adjacent to the second surface 210" of the light guide 210. When located at the second surface 210", the diffraction grating 222 may be a reflection mode diffraction grating. As a reflection mode diffraction grating, the diffraction grating 222 is configured to both diffract the guided light portion and reflect the diffracted guided light portion toward the first surface 210' to exit through the first surface 210' as the diffractively directional light beams 202. In other embodiments (not illustrated), the diffraction grating may be located between the surfaces of the light guide 210, e.g., as one or both of a transmission mode diffraction grating and a reflection mode diffraction grating.

According to some embodiments, the diffractive features of the diffraction grating 222 may comprise one or both of grooves and ridges that are spaced apart from one another.

The grooves or the ridges may comprise a material of the light guide 210, e.g., may be formed in a surface of the light guide 210. In another example, the grooves or the ridges may be formed from a material other than the light guide material, e.g., a film or a layer of another material on a surface of the light guide 210.

In some embodiments, the diffraction grating 222 of the multibeam element 220 is a uniform diffraction grating in which the diffractive feature spacing is substantially constant or unvarying throughout the diffraction grating 222. In other embodiments, the diffraction grating 222 is a chirped diffraction grating. By definition, the 'chirped' diffraction grating is a diffraction grating exhibiting or having a diffraction spacing of the diffractive features (i.e., the grating pitch) that varies across an extent or length of the chirped diffraction grating. In some embodiments, the chirped diffraction grating may have or exhibit a chirp of the diffractive feature spacing that varies linearly with distance. As such, the chirped diffraction grating is a 'linearly chirped' diffraction grating, by definition. In other embodiments, the chirped diffraction grating of the multibeam element 220 may exhibit a non-linear chirp of the diffractive feature spacing. Various non-linear chirps may be used including, but not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

Figure 6A:
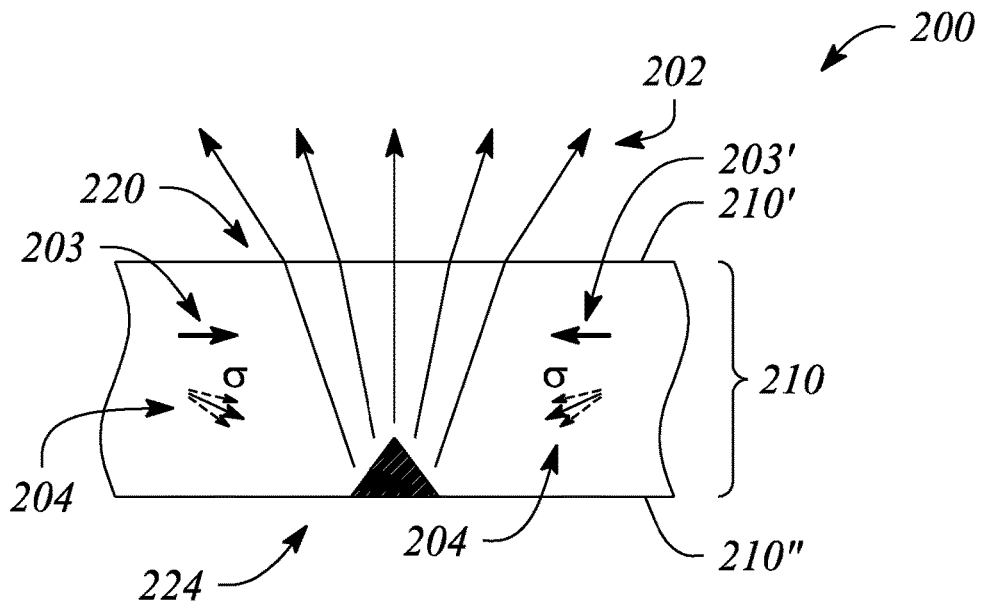
FIG. 6A illustrates a cross sectional view of a portion of a multiview display including a multibeam element in an example, according to another embodiment consistent with the principles described herein.
Figure 6B:
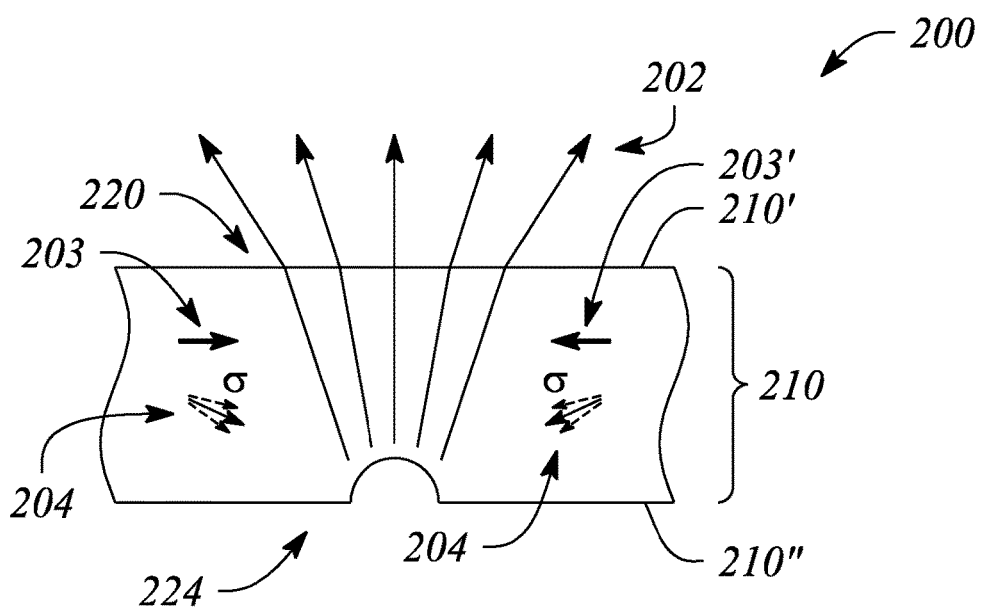
FIG. 6B illustrates a cross sectional view of a portion of a multiview display including a multibeam element in an example, according to another embodiment consistent with the principles described herein.

FIG. 6A illustrates a cross sectional view of a portion of a multiview display 200 including a multibeam element 220 in an example, according to another embodiment consistent with the principles described herein. FIG. 6B illustrates a cross sectional view of a portion of a multiview display 200 including a multibeam element 220 in an example, according to another embodiment consistent with the principles described herein. In particular, FIGS. 6A and 6B illustrate various embodiments of the multibeam element 220 comprising a micro-reflective element. Micro-reflective elements used as or in the multibeam element 220 may include, but are not limited to, a reflector that employs a reflective material or layer thereof (e.g., a reflective metal) or a reflector based on total internal reflection (TIR). According to some embodiments (e.g., as illustrated in FIGS. 6A-6B), the multibeam element 220 comprising the micro-reflective element may be located at or adjacent to a surface (e.g., the second surface 210") of the light guide 210. In other embodiments (not illustrated), the micro-reflective element may be located within the light guide 210 between the first and second surfaces 210', 210".

For example, FIG. 6A illustrates the multibeam element 220 comprising a micro-reflective element 224 having reflective facets (e.g., a 'prismatic' micro-reflective element) located adjacent to the second surface 210" of the light guide 210. The facets of the illustrated prismatic micro-reflective element 224 are configured to reflect (i.e., reflectively couple) the portion of the guided light 204 out of the light guide 210. The facets may be slanted or tilted (i.e., have a tilt angle) relative to a propagation direction of the guided light 204 to reflect the guided light portion out of light guide 210, for example. The facets may be formed using a reflective material within the light guide 210 (e.g., as illustrated in FIG. 6A) or may be surfaces of a prismatic cavity in the second surface 210", according to various embodiments. When a prismatic cavity is employed, either a refractive index change at the cavity surfaces may provide reflection (e.g., TIR reflection) or the cavity surfaces that form the facets may be coated by a reflective material to provide reflection, in some embodiments.

In another example, FIG. 6B illustrates the multibeam element 220 comprising a micro-reflective element 224 having a substantially smooth, curved surface such as, but not limited to, a semi-spherical micro-reflective element 224. A specific surface curve of the micro-reflective element 224 may be configured to reflect the guided light portion in different directions depending on a point of incidence on the curved surface with which the guided light 204 makes contact, for example. As illustrated in FIGS. 6A and 6B, the guided light portion that is reflectively scattered out of the light guide 210 exits or is emitted from the first surface 210', by way of example and not limitation. As with the prismatic micro-reflective element 224 in FIG. 6A, the micro-reflective element 224 in FIG. 6B may be either a reflective material within the light guide 210 or a cavity (e.g., a semi-circular cavity) formed in the second surface 210", as illustrated in FIG. 6B by way of example and not limitation. FIGS. 6A and 6B also illustrate the guided light 204 having two propagation directions 203, 203' (i.e., illustrated as bold arrows), by way of example and not limitation. Using two propagation directions 203, 203' may facilitate providing the plurality of directional light beams 202 with symmetrical principal angular directions, for example.

Figure 7:
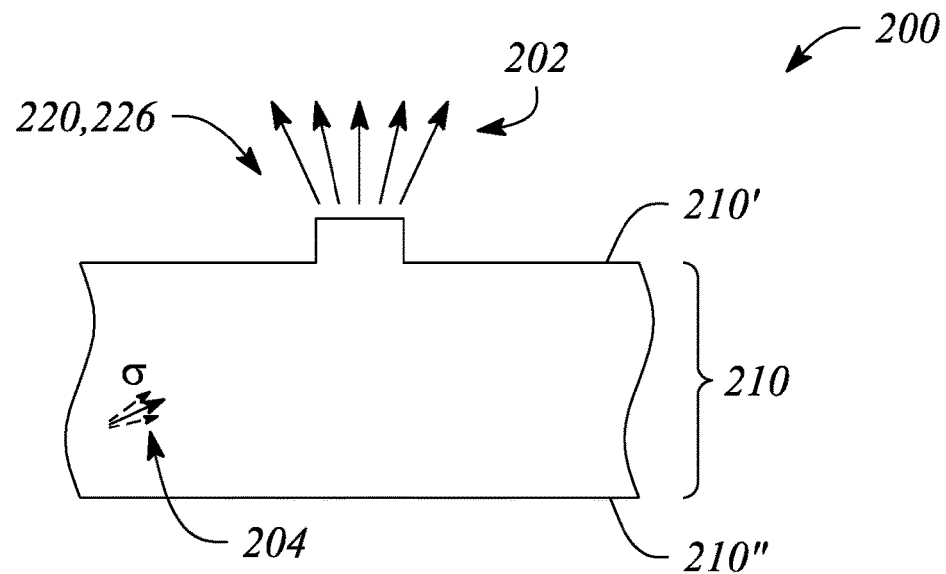
FIG. 7 illustrates a cross sectional view of a portion of a multiview display including a multibeam element in an example, according to another embodiment consistent with the principles described herein.

FIG. 7 illustrates a cross sectional view of a portion of a multiview display 200 including a multibeam element 220 in an example, according to another embodiment consistent with the principles described herein. In particular, FIG. 7 illustrates a multibeam element 220 comprising a micro-refractive element 226. According to various embodiments, the micro-refractive element 226 is configured to refractively couple out a portion of the guided light 204 from the light guide 210. That is, the micro-refractive element 226 is configured to employ refraction (e.g., as opposed to diffraction or reflection) to couple or scatter out the guided light portion from the light guide 210 as the directional light beams 202, as illustrated in FIG. 7. The micro-refractive element 226 may have various shapes including, but not limited to, a semi-spherical shape, a rectangular shape or a prismatic shape (i.e., a shape having sloped facets). According to various embodiments, the micro-refractive element 226 may extend or protrude out of a surface (e.g., the first surface 210') of the light guide 210, as illustrated, or may be a cavity in the surface (not illustrated). Further, the micro-refractive element 226 may comprise a material of the light guide 210, in some embodiments. In other embodiments, the micro-refractive element 226 may comprise another material adjacent to, and in some examples, in contact with the light guide surface.

In accordance with some embodiments of the principles described herein, a holographic reality multiview display is provided. The holographic reality multiview display is configured to emit modulated directional light beams as or that form pixels of a multiview image. The emitted, modulated directional light beams have different principal angular directions from one another corresponding to different view directions of views of the multiview image. In various non-limiting examples, the multiview image provided by the holographic reality multiview display may include one or more of four-by-four (4×4) views, four-by-eight (4×8) views, and eight-by-eight (8×8) views, each with a corresponding number of view directions. In some examples, the multiview image is configured to provide a three-dimensional (3D) representation of information (e.g., a scene or an object) as multiview content of the multiview image. As such, different ones of the emitted, modulated directional light beams may correspond to individual pixels of different views associated with the multiview image, according to various embodiments. Moreover, the different views may provide a 'glasses free' (e.g., autostereoscopic) representation of the information or the multiview content in the multiview image being displayed by the holographic reality multiview display.

Figure 8:
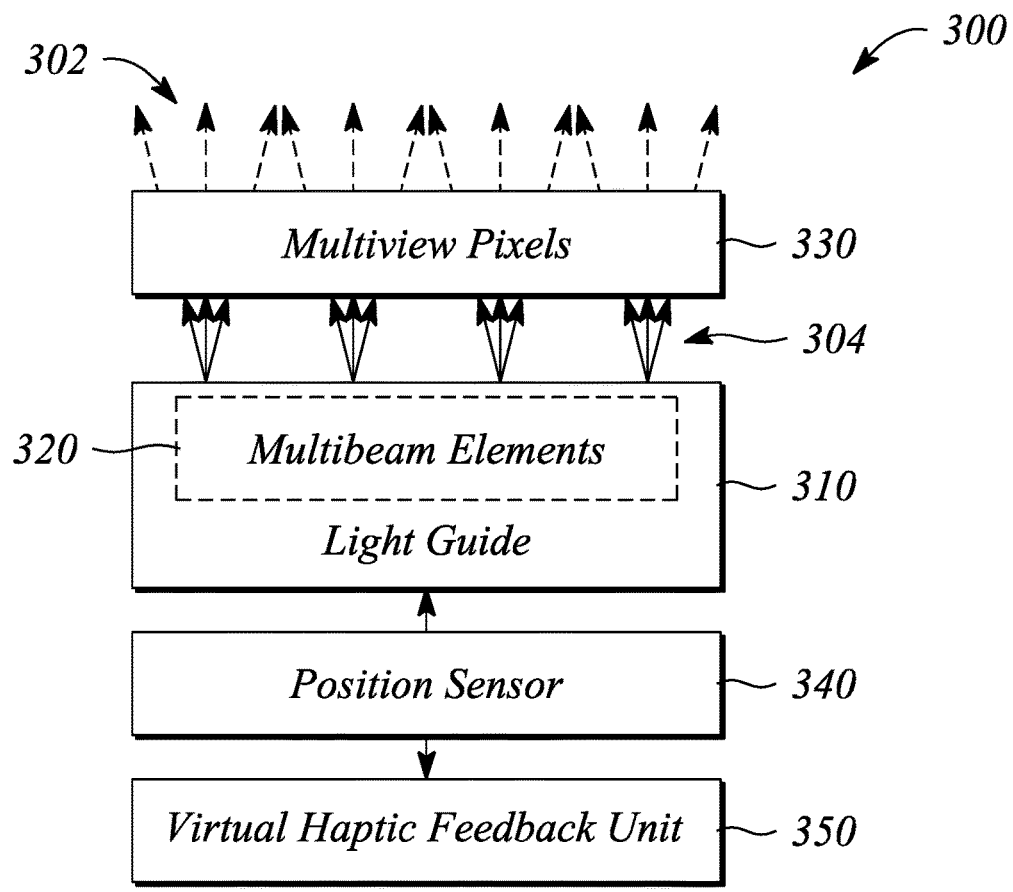
FIG. 8 illustrates a block diagram of holographic reality multiview display in an example, according to an embodiment consistent with the principles described herein.

FIG. 8 illustrates a block diagram of holographic reality multiview display 300 in an example, according to an embodiment consistent with the principles described herein. According to various embodiments, the holographic reality multiview display 300 is configured to display the multiview image comprising multiview content according to different views in different view directions. In particular, modulated directional light beams 302 emitted by the holographic reality multiview display 300 are used to display the multiview image and may correspond to pixels of the different views (i.e., view pixels) of the multiview image. The modulated directional light beams 302 are illustrated as arrows emanating from holographic reality multiview display 300 in FIG. 8. Dashed lines are used for the arrows of the emitted modulated directional light beams 302 to emphasize the modulation thereof by way of example and not limitation.

According to various embodiments, the holographic reality multiview display 300 illustrated in FIG. 8 comprises an array of the multiview pixels 330. The array of multiview pixels 330 is configured to provide a plurality of different views of a multiview image. According to various embodiments, a multiview pixel 330 of the multiview pixel array comprises a plurality of sub-pixels configured to modulate a plurality of directional light beams 304 and produce the emitted modulated directional light beams 302. In some embodiments, the multiview pixel 330 may be substantially similar to the set of light valves 230 of the array of light valves 230 corresponding to the multiview pixel 206, described above with respect to the multiview display 200, described above. In particular, a sub-pixel of the multiview pixel 330 may be substantially similar to the above-described light valve 230. That is, the multiview pixel 330 of the holographic reality multiview display 300 may comprises a set of light valves (e.g., the set of light valves 230), and a sub-pixel of the multiview pixel 330 may comprise a light valve (e.g., a single light valve 230) of the set.

According to various embodiments, the holographic reality multiview display 300 illustrated in FIG. 8 further comprises an array of multibeam elements 320. Each multibeam element 320 of the multibeam element array is configured to provide the plurality of directional light beams 304 to a corresponding multiview pixel 330. Directional light beams 304 of the plurality of directional light beams 304 have different principal angular directions from one another. In particular, the different principal angular directions of the directional light beams 304 correspond to different view directions of the different views of the holographic reality multiview display 300, according to various embodiments.

In some embodiments, the multibeam element 320 of the multibeam element array may be substantially similar to the multibeam element 220 of the multiview display 200, described above. For example, the multibeam element 320 may comprise a diffraction grating substantially similar to the diffraction grating 222, described above and illustrated in FIGS. 5A-5B. In another example, the multibeam element 320 may comprise a micro-reflective element that is substantially similar to the micro-reflective element 224, described above and illustrated in FIGS. 6A-6B. In yet another example, the multibeam element 320 may comprise a micro-refractive element. The micro-refractive element may be substantially similar to the micro-refractive element 226 described above and illustrated in FIG. 7.

In some embodiments, (e.g., as illustrated in FIG. 8), the holographic reality multiview display 300 may further comprise a light guide 310. The light guide 310 is configured to guide light as the guided light. The light may be guided, e.g., as a guided light beam, according to total internal reflection, in various embodiments. For example, the light guide 310 may be a plate light guide configured to guide light from a light-input edge thereof as a guided light beam. In some embodiments, the light guide 310 of the holographic reality multiview display 300 may be substantially similar to the light guide 210 described above with respect to the multiview display 200. Hence, the multibeam elements 320 of the multibeam element array may be configured to scatter a portion of the guided light out of the light guide 310 as the directional light beams 304.

Further, according to various embodiments, a size of a multibeam element 320 of the multibeam element array may be comparable to a size of a sub-pixel of the sub-pixel plurality in the multiview pixel 330. For example, the size of the multibeam element 320 may be greater than one half of the sub-pixel size and less than twice the sub-pixel size, in some embodiments. In addition, an inter-element distance between multibeam elements 320 of the multibeam element array may correspond to an inter-pixel distance between multiview pixels 330 of the multiview pixel array, according to some embodiments. For example, the inter-element distance between the multibeam elements 320 may be substantially equal to the inter-pixel distance between the multiview pixels 330. In some examples, the inter-element distance between multibeam elements 320 and the corresponding inter-pixel distance between multiview pixels 330 may be defined as a center-to-center distance or an equivalent measure of spacing or distance.

Additionally, there may be a one-to-one correspondence between the multiview pixels 330 of the multiview pixel array and the multibeam elements 320 of the multibeam element array. In particular, in some embodiments, the inter-element distance (e.g., center-to-center) between the multibeam elements 320 may be substantially equal to the inter-pixel distance (e.g., center-to-center) between the multiview pixels 330. As such, each sub-pixel in the multiview pixel 330 may be configured to modulate a different one of the directional light beams 304 of the directional light plurality provided by a corresponding multibeam element 320. Further, each multiview pixel 330 may be configured to receive and modulate the directional light beams 304 from one and only one multibeam element 320, according to various embodiments.

In some of embodiments (not illustrated) that include the light guide 310, the holographic reality multiview display 300 may further comprise a light source. The light source may be configured to provide the light to the light guide 310 having a non-zero propagation angle and, in some embodiments, and being collimated according to a collimation factor to provide a predetermined angular spread of the guided light within the light guide 310, for example. According to some embodiments, the light source may be substantially similar to the light source 240 of the above-described multiview display 200. In some embodiments, a plurality of light sources may be employed. For example, a pair of light sources may be used at two different edges or ends (e.g., opposite ends) of the light guide 310 to provide the light to the light guide 310.

As illustrated in FIG. 8, the holographic reality multiview display 300 further comprises a position sensor 340. The position sensor 340 is configured to monitor a position of a hand of a user. Further, the position sensor 340 is configured to monitor the position of the hand without physical contact between the user and the holographic reality multiview display 300. For example, the position sensor 340 may be configured to detect a gesture by the user that corresponds to a command or equivalent user input to provide control of the holographic reality multiview display 300.

In particular, the gesture may be performed above or in the vicinity of the holographic reality multiview display 300, according to various embodiments. Further, the gesture may be performed as a virtual interaction with a virtual control (i.e., an object, a virtual icon, or another control, etc.) that is displayed by the holographic reality multiview display 300. According to various embodiments, the holographic reality multiview display 300 is configured to modify multiview content of the multiview image based on the monitored position of the hand during or as a result of the performed gesture. Moreover, the gesture may modify the multiview content as if a physical interaction between the hand of the user and the virtual control had occurred even though there is no such physical contact. That is, the holographic reality multiview display 300 is configured to provide control of the multiview content using the performed gesture according to the virtual interaction that does not include contact between the user and the holographic reality multiview display 300.

In some embodiments, the position sensor 340 may be substantially similar to the position sensor 120 (or measurement subsystem) of the above-described holographic reality system 100. For example, the position sensor 340 may comprise one or more of a capacitive sensor, a plurality of image sensors (e.g., such as, but not limited to, a digital camera comprising a CMOS or a CCD image sensor), and a time-of flight sensor. In some embodiments, the time-of-flight sensor may employ a wireless signal that includes, but is not limited to, an RF/microwave signal, an acoustic signal, an infrared signal, and an optical signal comprising a visible or ultraviolet wavelength.

According to various embodiments, the holographic reality multiview display 300 illustrated in FIG. 8 further comprises a virtual haptic feedback unit 350. The virtual haptic feedback unit 350 is configured to provide virtual haptic feedback to the user, the virtual haptic feedback being based on the monitored position. Further, an extent of the virtual haptic feedback corresponds to an extent of the virtual control. That is, the extent of the virtual haptic feedback corresponds to one or more of a size, a shape, and a location of the virtual control within the multiview image. Thus, the user may perceive a contact having physical interaction with the virtual control as a result of the virtual haptic feedback, according to various embodiments. Moreover, the perception of physical interaction may provide sensory information to the user that simulates a response to the gesture by the user. For example, the virtual control within the multiview image may correspond to a virtual icon and the virtual haptic feedback unit 350 may be configured to provide sensory information to the user corresponding to an activation of the virtual icon in response to the monitored position.

Figure 9:
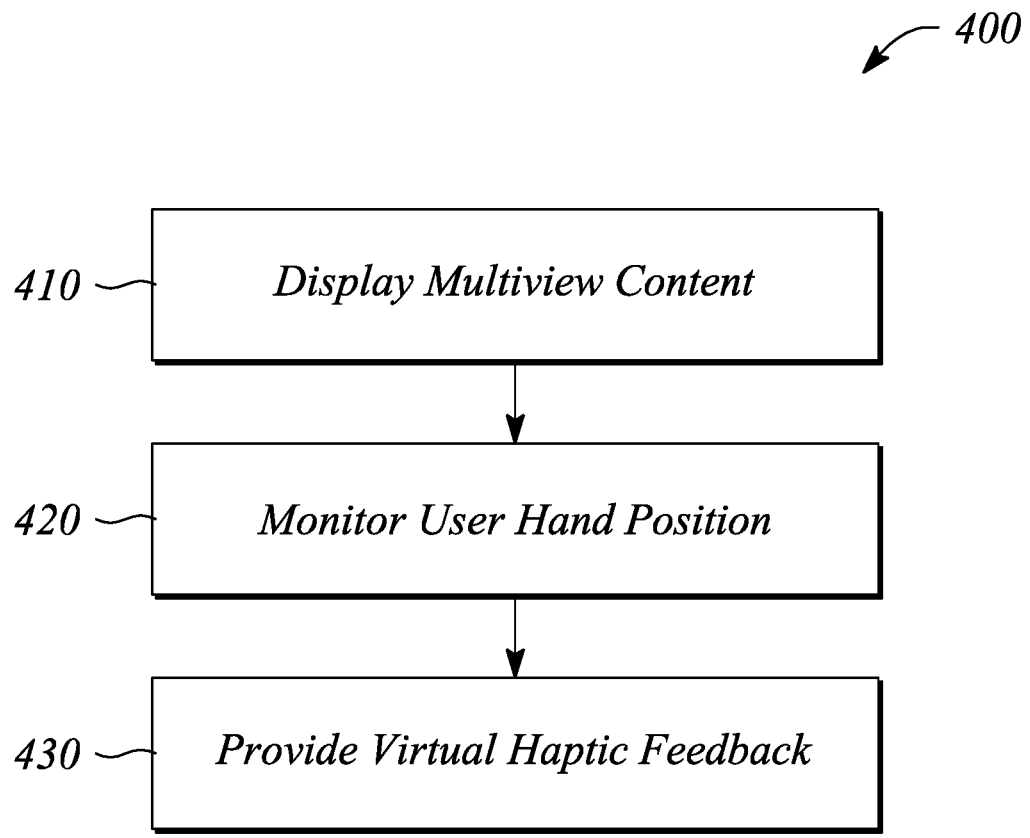
FIG. 9 illustrates a flow chart of a method of holographic reality system operation in an example, according to an embodiment consistent with the principles described herein.

In accordance with other embodiments of the principles described herein, a method of display system operation is provided. FIG. 9 illustrates a flow chart of a method 400 of holographic reality system operation in an example, according to an embodiment consistent with the principles described herein. As illustrated in FIG. 9, the method 400 of holographic reality system operation comprises displaying 410 multiview content as a multiview image using a multiview display of the holographic reality system. In some embodiments, displaying 410 the multiview content may comprise providing directional light beams having different principal angular directions corresponding to different view directions of the multiview image and modulating the directional light beams using a plurality of light valves (or equivalently using an array of light valves). In some embodiments, the directional light beams may be provided using a plurality of multibeam elements spaced apart from one another, wherein a multibeam element of the multibeam element plurality is be configured to scatter out a portion of guided light from a light guide as the directional light beams.

In some embodiments, the multibeam element of the multibeam element plurality may be substantially similar to the multibeam elements 220 of the above-described multiview display 200. For example, multibeam elements may comprise one or more of a diffraction grating, a micro-reflective element, or a micro-refractive element that is substantially similar to the above-described diffraction grating 222, the micro-reflective element 224, and the micro-refractive element 226 of the multiview display 200. Further, the multibeam elements may have a size that is comparable to a size of a sub-pixel of the multiview pixel.

According to some embodiments, the plurality of light valves may be substantially similar to the array of light valves 230 described above with respect to the multiview display 200. In particular, different sets of light valves may correspond to different multiview pixels in a manner similar to the correspondence of the first and second light valve sets 230a, 230b to different multiview pixels 206, as described above. Further, individual light valves of the light valve array may correspond to sub-pixels of the multiview pixels as the above-described light valve 230 corresponds to the sub-pixel in the above-reference discussion of the multiview display 200.

In some embodiments (not illustrated), the method 400 of holographic display system operation further comprises providing light to the light guide using a light source. The light may be provided one or both of having a non-zero propagation angle within the light guide and being collimated according to a predetermined collimation factor. According to some embodiments, the light guide may be substantially similar to the light guide 210 described above with respect to the multiview display 200. In particular, the light may be guided according to total internal reflection within the light guide, according to various embodiments. Further, the light source may be substantially similar to the light source 240, also described above.

In some embodiments (not illustrated) the method of display system operation further comprises guiding light along a light guide as guided light. In some embodiments, the light may be guided at a non-zero propagation angle. Further, the guided light may be collimated, e.g., collimated according to a predetermined collimation factor. According to some embodiments, the light guide may be substantially similar to the light guide 210 described above with respect to the multiview display 200. In particular, the light may be guided according to total internal reflection within the light guide, according to various embodiments.

As illustrated in FIG. 9, the method 400 of holographic reality system operation further comprises monitoring 420 a position (or motion) of a hand of a user. According to various embodiments, monitoring 420 a position of a hand may employ or use a position sensor of the holographic reality system. Further, monitoring 420 a position of a hand may be performed without physical contact between the user and the holographic reality system (i.e., including the position sensor and the multiview display). For example, the position sensor may include one or more of a capacitive sensor, a plurality of image sensors (such as a camera or a CMOS or a CCD image sensor), and a time-of-flight sensor. In particular, monitoring the position of a hand using a position sensor may comprise one or more of monitoring a change in capacitance corresponding to the position of the hand using a capacitive sensor, monitoring the position of the hand using image processing of images captured by different image sensors of a plurality of image sensors, and monitoring the position of the hand using reflection of a wireless signal by the hand using a time-of-flight sensor. Further, the time-of-flight sensor may use one or more wireless signals including, but not limited to an RF/microwave signal, an acoustic signal, an infrared signal, and another optical signal in a visible or ultraviolet wavelength. In some embodiments, the position sensor may be substantially similar to the position sensor 120 as described above with respect to the holographic reality system 100.

The method 400 of holographic reality system operation illustrated in FIG. 9 further comprises providing 430 virtual haptic feedback to the user using a virtual haptic feedback unit. According to various embodiments, the provided 430 virtual haptic feedback is based on the monitored position of the hand. Further, the virtual haptic feedback is provided 430 provide without physical contact between the user and the holographic reality system (i.e., including the virtual haptic feedback unit and the multiview display). According to various embodiments, an extent of the virtual haptic feedback corresponds to an extent of a virtual control within the multiview image.

In some embodiments, the virtual haptic feedback unit used in providing 430 virtual haptic feedback may be substantially similar to the virtual haptic feedback unit 130 of the above-described holographic reality system 100. In particular, providing 430 virtual haptic feedback using the virtual haptic feedback unit may comprise generating a physical sensation at the hand using one or more of ultrasonic pressure, air pressure, and electrostatic charge, the physical sensation being generated in a region of space corresponding to the extent of the virtual haptic feedback. In some embodiments (not illustrated), the method 400 of holographic reality system operation further comprises modifying the multiview content of the multiview image based at least in part on the monitored position or motion.

Thus, there have been described examples and embodiments of a holographic reality system, a holographic reality multiview display, and a method of holographic reality system operation that employ non-contact monitoring and non-contact virtual haptic feedback to provide user interaction and control if multiview content within a displayed multiview image. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A holographic reality system, comprising:
a multiview display configured to display multiview content as a multiview image and further configured to provide a plurality of directional light beams corresponding to a plurality of different views of the multiview display, the plurality of directional light beams having different principal angular directions from one another corresponding to different view directions of the different views, the multiview display comprising a light guide configured to guide light in a propagation direction along a length of the light guide as guided light, the multiview display further comprising a plurality of multibeam elements distributed along the length of the light guide, a multibeam element of the multibeam element plurality being configured to scatter out from the light guide a portion of the guided light as the plurality of directional light beams having the different principal angular directions of the different views;
a position sensor configured to monitor a position of a hand of a user and provide a monitored position of the hand, the monitored position being provided by the position sensor without contact between the user and the holographic reality system; and
a virtual haptic feedback unit configured to provide virtual haptic feedback to the user based on the monitored position, the virtual haptic feedback being provided using one or more of ultrasonic pressure and air pressure without contact between the user and holographic reality system,
wherein an extent of the virtual haptic feedback corresponds to an extent of a virtual control within the multiview image.

2. The holographic reality system of claim 1, wherein the holographic reality system is configured to modify the displayed multiview content according to the monitored position.

3. The holographic reality system of claim 1, wherein the position sensor comprises one or more of a capacitive sensor, a plurality of image sensors, and a time-of-flight sensor.

4. The holographic reality system of claim 3, wherein the time-of-flight sensor is configured to use one or more of a radio frequency, a microwave signal, an acoustic signal, an infrared signal, and another optical signal.

5. The holographic reality system of claim 1, wherein the position sensor is configured to detect motion of one or more digits of the hand.

6. The holographic reality system of claim 1, wherein the position sensor is configured to detect a gesture by the user corresponding to a command.

7. The holographic reality system of claim 1, wherein the virtual haptic feedback unit is configured to provide information about activation of the virtual control in the multiview content in response to the monitored position.

8. The holographic reality system of claim 1, wherein the multiview display further comprises an array of multiview pixels, each including a plurality of sub-pixels configured to provide the different views by modulating directional light beams of the plurality of directional light beams.

9. The holographic reality system of claim 1, wherein the multiview display further comprises a light source optically coupled to an input of the light guide, the light source being configured to provide the light to be guided as the guided light.

10. A holographic reality multiview display comprising:
an array of multiview pixels configured to provide a plurality of different views of a multiview image, a multiview pixel comprising a plurality of sub-pixels configured to modulate a plurality of directional light beams having directions corresponding to view directions of the different views;

a light guide configured to guide light in a propagation direction along a length of the light guide as guided light;

an array of multibeam elements distributed along the length of the light guide, each multibeam element being configured to scatter out from the light guide a portion of the guided light to form the plurality of directional light beams and provide the plurality of directional light beams to a corresponding multiview pixel;

a position sensor configured to monitor a position of a hand of a user relative to a virtual control within the multiview image without contact between the user and the holographic reality multiview display; and a virtual haptic feedback unit configured to provide virtual haptic feedback to the user using one or more of ultrasonic pressure and air pressure, the virtual haptic feedback being provided based on the monitored position of the hand, an extent of the virtual haptic feedback corresponding to an extent of the virtual control.

11. The holographic reality multiview display of claim 10, wherein the holographic reality display is configured to modify multiview content of the multiview image based on the monitored position.

12. The holographic reality multiview display of claim 10, wherein the position sensor comprises one or more of a capacitive sensor, a plurality of image sensors, and a time-of-flight sensor.

13. The holographic reality multiview display of claim 10, wherein the virtual control within the multiview image comprises a virtual icon and the virtual haptic feedback unit is configured to provide sensory information to the user corresponding to an activation of the virtual icon in response to the monitored position.

14. A method of holographic reality system operation, comprising:

displaying multiview content as a multiview image using a multiview display of the holographic reality system, the multiview display comprising a light guide that guides light in a propagation direction along a length of the light guide as guided light, the multiview display further comprising a plurality of multibeam elements distributed along the length of the light guide a multibeam element of the multibeam element plurality scattering out from the light guide a portion of the guided light as a plurality of directional light beams having different principal angular directions that correspond to different views of the multiview display;

monitoring a position of a hand of a user using a position sensor of the holographic reality system without physical contact between the user and the holographic reality system; and providing virtual haptic feedback to the user using a virtual haptic feedback unit, the virtual haptic feedback being based on the monitored position of the hand and being provided using one or more of ultrasonic pressure and air pressure without physical contact between the user and the holographic reality system, wherein an extent of the virtual haptic feedback corresponds to an extent of a virtual control within the multiview image.

15. The method of holographic reality system operation of claim 14, wherein monitoring the position of a hand using a position sensor comprises one or more of monitoring a change in capacitance corresponding to the position of the hand using a capacitive sensor, monitoring the position of the hand using image processing of images captured by different image sensors of a plurality of image sensors, and monitoring the position of the hand using reflection of a wireless signal by the hand using a time-of-flight sensor.

16. The method of holographic reality system operation of claim 14, wherein providing virtual haptic feedback using a virtual haptic feedback unit comprises generating a physical sensation at the hand using one or more of ultrasonic pressure and air pressure, the physical sensation being generated in a region of space corresponding to the extent of the virtual haptic feedback.

\* \* \* \* \*